United States Patent
Zhang et al.

(10) Patent No.: US 11,168,207 B2
(45) Date of Patent: Nov. 9, 2021

(54) GREEN EPOXY RESIN WITH BIOBINDER FROM MANURE

(71) Applicant: North Carolina Agricultural and Technical State University, Greensboro, NC (US)

(72) Inventors: Lifeng Zhang, Oak Ridge, NC (US); Elham H. Fini, Greensboro, NC (US); Sidharth Reddy Karnati, Greensboro, NC (US)

(73) Assignee: North Carolina Agricultural and Technical State University, Greensboro, NC (US)

( * ) Notice: Subject to any disclaimer, the term of this patent is extended or adjusted under 35 U.S.C. 154(b) by 0 days.

(21) Appl. No.: 16/259,643

(22) Filed: Jan. 28, 2019

(65) Prior Publication Data

US 2019/0233638 A1 Aug. 1, 2019

Related U.S. Application Data

(60) Provisional application No. 62/622,866, filed on Jan. 27, 2018.

(51) Int. Cl.

| | | |
|---|---|---|
| *C08L 63/00* | (2006.01) | |
| *C10G 7/06* | (2006.01) | |
| *C10G 7/00* | (2006.01) | |
| *C08G 59/06* | (2006.01) | |
| *C08G 59/40* | (2006.01) | |
| *C08J 5/24* | (2006.01) | |
| *C08J 5/04* | (2006.01) | |
| *C08K 11/00* | (2006.01) | |

(52) U.S. Cl.
CPC ............ *C08L 63/00* (2013.01); *C08G 59/063* (2013.01); *C08G 59/4007* (2013.01); *C08J 5/042* (2013.01); *C08J 5/043* (2013.01); *C08J 5/046* (2013.01); *C08J 5/24* (2013.01); *C08J 2363/00* (2013.01); *C08K 11/005* (2013.01); *C10G 7/006* (2013.01); *C10G 7/06* (2013.01); *C10G 2300/1018* (2013.01)

(58) Field of Classification Search
None
See application file for complete search history.

(56) References Cited

U.S. PATENT DOCUMENTS

| | | | |
|---|---|---|---|
| 3,733,255 A | 5/1973 | Appell | |
| 6,506,223 B2 | 1/2003 | White | |
| 7,105,088 B2 | 9/2006 | Schien et al. | |
| 7,754,322 B2 | 7/2010 | Tillbrook et al. | |
| 7,951,417 B1 | 5/2011 | Wen et al. | |
| 7,985,345 B2 | 7/2011 | Lux et al. | |
| 8,100,990 B2 | 1/2012 | Ellens et al. | |
| 9,637,615 B2 | 5/2017 | Fini | |
| 10,077,356 B2 | 9/2018 | Fini | |
| 2009/0062516 A1* | 3/2009 | Belanger | D21C 5/00 530/502 |
| 2009/0275674 A1* | 11/2009 | Tian | C09D 133/02 522/183 |
| 2011/0294927 A1 | 12/2011 | Williams et al. | |
| 2014/0083331 A1* | 3/2014 | Fini | C09D 195/00 106/284.4 |
| 2014/0261075 A1* | 9/2014 | Chirdon | C09J 189/04 106/124.1 |
| 2016/0053141 A1* | 2/2016 | Grun | C09J 105/00 156/307.1 |
| 2016/0229997 A1* | 8/2016 | Mohanty | C08K 7/14 |
| 2016/0326367 A1* | 11/2016 | Mohanty | C08L 69/00 |
| 2017/0107334 A1* | 4/2017 | Mohanty | C08J 3/226 |
| 2017/0260371 A1 | 9/2017 | Fini | |
| 2019/0112454 A1 | 4/2019 | Fini | |

FOREIGN PATENT DOCUMENTS

| | | |
|---|---|---|
| EP | 2 898 037 B1 | 6/2020 |
| WO | WO 2014/047462 | 3/2014 |

OTHER PUBLICATIONS

Alternative Binders for Sustainable Asphalt Pavements, Transporation Research Circular. No. E-C165, pp. 1-85 (Aug. 2012).

Fini et al., "Bonding Property of Bituminous Crack Sealants in the Presence of Water," American Journal of Engineering and Applied Science. vol. 4, No. 1, pp. 124-129 (2011).

Fini et al, "Developement of Pressurized Blister Test for Interface Characterization of Aggregate—Highly Polymerized Bituminous Materials," ASCE Journal of Materials, American Society of Civil Engineering (ASCE), vol. 23, No. 5, pp. 656-663 (2011).

Fini et al, "Reducing Asphalt's Low Temperature Cracking by Disturbing its Crystallization," 7th RILEM International Conference on Cracking in Pavements June 20-22, 2012 in Delft, Netherlands, RILEM Bookseries, vol. 4, pp. 911-919 (Jun. 2012).

Fini et al., "Bio-Modified Rubber: A Sustainable Alternative for Use in Asphalt Pavements," ICSDEC 2012 Developing the Frontier of Sustainable Design, Engineering, and Construction, ASCE, pp. 1-13 (2012).

Fini et al., "Characterization and Application of Manure-Based Bio-binder in Asphalt Industry," Paper No. 10-2871 The 89th Transportation Research Board Annual Meetings, Washington, D.C., pp. 1-14 (14 pages) (Jan. 2010).

(Continued)

*Primary Examiner* — Megan McCulley
(74) *Attorney, Agent, or Firm* — Jenkins, Wilson, Taylor & Hunt, P.A.

(57) ABSTRACT

A curable green epoxy resin composition is described. More particularly, the curable green epoxy resin composition includes a biobinder isolated from bio-oil produced from animal waste, such as from swine manure. The biobinder can act as a curing agent for an epoxy resin component in the resin composition. Cured green epoxy resins, prepregs containing the curable green epoxy resin, and related composite materials are described. In addition, methods of preparing the curable green epoxy resin composition and of curing the curable green epoxy resin.

19 Claims, 9 Drawing Sheets

(56) References Cited

OTHER PUBLICATIONS

Fini et al., "Chemical Characterization of Biobinder from Swine Manure: A Sustainable Modifier for Asphalt Binder," Journal of Materials in Civil Engineering. vol. 23, No. 11 pp. 1506-1513 (2011).
Fini et al., "Partial Replacement of Asphalt Binder with Bio-Binder: Characterization and Modification," International Journal of Pavement Engineering. pp. 1-8 (Jul. 4, 2011).
Fini et al., "Application of Swine Manure in Development of Bio-Adhesive," Allen D. Leman Swine Conference, p. 244 (Sep. 18, 2012).
Guo et al., "Pyrolysis Characteristics of Bio-oil Fractions Separated by Molecular Distillation," Applied Energy, vol. 87, No. 9 pp. 2892-2898 (2010).
He, "Rheological Hybrid Effect and its Conditions in Filled Polymer Melts," Macromol. Symp., 277, pp. 43-50 (2009).
Hill et al., "Low-Temperature Performance Characterization of Biomodified Asphalt Mixtures That Contain Reclaimed Asphalt Pavement," Transportation Research Record: Journal of the Transportation Research Board 2371, pp. 49-57 (2013).
Interview Summary corresponding to U.S. Appl. No. 14/032,445 dated Dec. 5, 2016.
Mi et al., "Rheological Hybrid Effect in Dually Filled Polycarbonate Melt Containing Liquid Crystalline Polymer," Polymer Engineering and Science, DOI 10.1002/pen, pp. 289-299 (2012).
Midgett, "Assessing a Hydrothermal Liquefaction Process Using Biomass Feedstocks," Thesis, Louisiana State University (2008).
Mogawer et al., "Performance Characteristics of High RAP Bio-Modified Asphalt Mixtures," Paper No. 12-2411, the 91st Transportation Research Board Annual Meetings, Washington, D.C., pp. 1-16 (Jan. 2012).
Notice of Allowance corresponding to U.S. Appl. No. 15/470,396 dated May 14, 2018.
Notice of Publication corresponding to International Application No. PCT/US2013/060968 dated Mar. 27, 2014.
Notice of Publication corresponding to U.S. Appl. No. 16/126,354 dated Apr. 18, 2019.
Notification Concerning Transmittal of International Preliminary Report on Patentability (Chapter I of the Patent Cooperation Treaty) corresponding to International Patent Applciation No. PCT/US2013/060968 dated Apr. 2, 2015.
Notification of Transmittal of the International Search Report and the Written Opinion corresponding to International Patent Application No. PCT/US2013/060968 dated Dec. 13, 2013.
Ocfemia, "Hydrothermal Process of Swine Manure to Oil Using a Continuous Reactor System," Dissertation, University of Illinois at Urbana-Champaign, AAT 3202149, pp. iii-183 (Sep. 22, 2005).
Ocfemia et al., "Hydrothermal Processing of Swine Manure to Oil Using a Continuous Reactor System: Effects of Operating Parameters on Oil Yield and Quality," Transactions of the ASABE. vol. 49, No. 6 pp. 1897-1904 (2006).
Ocfemia, K. S., Zhang, Y., & Funk, T. "Hydrothermal processing of swine manure into oil using a continuous reactor system: Development and testing." Transactions-American Society of Agricultural Engineers, 49(2), 533-541 (2006).
Office Action (Restriction Requirement) corresponding to U.S. Appl. No. 14/032,445 dated Nov. 9, 2015.
Office Action and Interview Summary corresponding to U.S. Appl. No. 14/032,445 dated May 31, 2016.
Office Action corresponding to U.S. Appl. No. 15/470,396 dated Nov. 15, 2017.
Onochie et al., "Rheological Characterization of Nano-particle based Bio-modified Binder," Transportation Research Board 92nd Annual Meeting, Washington, D.C., 16 pages (2013).
Supplementary European Search Report corresponding to European Patent Application No. 13838845.9-1302 dated Apr. 8, 2016.
Taratec Corporation, "NuVention Solutions, Inc.," in 2011 TFAMP Evaluation Summary, pp. 1-2 (Aug. 2011).
US EPA Ag 101 Poultry Production; www.epa.gov/oecaagct/ag101/printpoultry.html; last updated Jun. 27, 2012; pp. 1-32.
USDA, "Poultry—Production of Value 2012 Summary," United States Department of Agriculture National Agricultural Statistics Serives, 14 pages (Apr. 2013).
Xiu et al., "Bio-oil production and upgrading research : A review," Renewable and Sustainable Energy Reviews. vol. 16 pp. 4406-4414 (2012).
Yang et al., "Biorenewable epoxy resins derived from plant-based phenolic acids," ACS Sustainable Chemistry & Engineering, 4(12), pp. 6524-6533 (2016).
Yue et al., "A sustainable alternative to current epoxy resin matrices for vacuum infusion molding," Composites Part A: Applied Science and Manufacturing, 100, pp. 269-274 (2017).
Yero et al., "Viscosity Characteristics of Modified Bitumen," ARPN Journal of Science and Technology, vol. 2, No. 5, pp. 500-503 (Jun. 2012).
You et al., "Evaluation of Low-Temperature Binder Properties of Warm-Mix Asphalt, Extracted and Recovered RAP and RAS, and Bioasphalt," Journal of Materials in Civil Engineering. vol. 23, No. 11 pp. 1569-1574 (2011).
Fini, et al., "Chemical Characterization of Biobinder from Swine Manure: Sustainable Modifier for Asphalt Binder,"Journal of Materials in Civil Engineering, vol. 23, No. 11, pp. 1506-1513 (2011).
Office Action corresponding to European Patent Application No. 13 838 845.9 dated Sep. 5, 2019.
Intent to Grant corresponding to European Patent Application No. 13 838 845.9 dated Jan. 17, 2020.
Office Action (Restriction Requirement) corresponding to U.S. Appl. No. 16/126,354 dated Dec. 11, 2020.
Non-Final Office Action corresponding to U.S. Appl. No. 16/126,354 dated Feb. 23, 2021.
Notice of Allowance corresponding to U.S. Appl. No. 16/126,354 dated Jun. 14, 2021.
Corrected Notice of Allowability corresponding to U.S. Appl. No. 16/126,354 dated Aug. 2, 2021.

* cited by examiner

GREEN EPOXY RESIN WITH BIOBINDER FROM MANURE

RELATED APPLICATIONS

The presently disclosed subject matter claims the benefit of U.S. Provisional Patent Application Ser. No. 62/622,866, filed Jan. 27, 2018; the disclosure of which is incorporated herein by reference in its entirety.

TECHNICAL FIELD

The presently disclosed subject matter relates generally to an improved environmentally sustainable epoxy resin composition, to methods of preparing and curing the resin composition, and to materials, such as prepregs and composite materials, prepared from the epoxy resin composition. In particular, the presently disclosed subject matter relates to epoxy resin compositions comprising a biobinder isolated from a bio-oil produced from animal waste, such as manure.

Abbreviations

%=percent or percentage
° C.=degrees Celsius
BB=biobinder
$cm^{-1}$=wavenumber
cP=centipoise
FTIR=Fourier-transform infrared spectroscopy
GPa=gigapascal
Hg=mercury
min=minutes
MPa=megapascal
SEM=scanning electron microscope
wt. %=weight percentage

BACKGROUND

Epoxy resin is a class of polymer resins containing epoxide functional groups. Epoxy resin is solidified/hardened ("cured") via a cross-linking reaction with a co-reactant, typically a polyfunctional amine. Such co-reactants are generally referred to as a "hardener" or a "curing agent." The epoxide functional groups in the epoxy resin and the amine functional groups in the hardener react and generate a three-dimensional cross-linked molecular network in the cured material, which can have mechanical properties and temperature/chemical resistance useful to a wide range of consumer and industrial applications such as adhesive, coating, electrical insulators, and structural composite materials.

Epoxy resin is the most prevalent thermoset resin in the field of polymer composites. Most epoxy resins are made via a reaction between epicholohydrin (2-(chloromethyl)oxirane) and bisphenol A (4,4'-(propane-2,2-diyl)diphenol). However, the use of epicholohydrin and bisphenol A have raised concerns regarding sustainability and their effect on human health. The waste generated from used epoxy resin based composite materials, in the meantime, has raised concerns about environmental pollution. Thus, there is increasing demand for additional epoxy resins that are both environmentally friendly ("green") and sustainable.

SUMMARY

In some embodiments, the presently disclosed subject matter provides a curable epoxy resin composition comprising: (a) an epoxy resin component; and (b) a biobinder isolated from a bio-oil produced from animal waste, optionally beef manure, dairy manure, swine manure, sheep manure, poultry manure, or a combination thereof. In some embodiments, the epoxy resin component comprises one or more of epichlorohydrin, bisphenol A, and Bisphenol F.

In some embodiments, the biobinder is isolated from a bio-oil produced from swine manure. In some embodiments, the biobinder is free of compounds having a boiling point at 3 mm Hg of 60° C. or less.

In some embodiments, the curable epoxy resin composition comprises at least about 15% by weight of biobinder. In some embodiments, the curable epoxy resin composition comprises about 30% by weight of the biobinder.

In some embodiments, the curable epoxy resin composition further comprises one or more additional performance enhancing or modifying agents, optionally wherein the one or more additional performance enhancing or modifying agents are selected from the group comprising a non-epoxy resin, a flexibilizer, a stabilizer, a flow promoter, a toughening agent, an accelerator, a core shell rubber, a flame retardant, a wetting agent, a colorant, a UV absorber, an antioxidant, an antimicrobial agent, a filler, a conducting particle, and a viscosity modifier.

In some embodiments, the presently disclosed subject matter provides an article comprising a cured epoxy resin prepared by curing a curable epoxy resin composition comprising an epoxy resin component and a biobinder isolated from a bio-oil produced from animal waste, optionally beef manure, dairy manure, swine manure, sheep manure, poultry manure, or a combination thereof.

In some embodiments, the presently disclosed subject matter provides a kit for providing a curable epoxy resin composition comprising an epoxy resin component and a biobinder isolated from a bio-oil produced from animal waste, optionally beef manure, dairy manure, swine manure, sheep manure, poultry manure, or a combination thereof; wherein the kit comprises: (a) a first sealable container containing the one or more epoxy resin component; and (b) a second sealable container containing the biobinder. In some embodiments, the kit further comprises one or more additional performance enhancing or modifying agents, optionally wherein the one or more additional performance enhancing or modifying agents are selected from the group comprising a non-epoxy resin, a flexibilizer, a stabilizer, a flow promoter, a toughening agent, an accelerator, a core shell rubber, a flame retardant, a wetting agent, a colorant, a UV absorber, an antioxidant, an antimicrobial agent, a filler, a conducting particle, and a viscosity modifier.

In some embodiments, the presently disclosed subject matter provides a method of preparing a cured epoxy resin composition, the method comprising contacting biobinder isolated from a bio-oil produced from animal waste with at least one epoxy resin component, to provide a curable epoxy resin composition; and curing the curable epoxy resin composition. In some embodiments, the at least one epoxy resin component comprises one or more of epichlorohydrin, bisphenol A, and Bisphenol F.

In some embodiments, the method further comprises contacting the biobinder, epoxy resin, or combination thereof with one or more additional performance enhancing or modifying agents, optionally wherein the one or more additional performance enhancing or modifying agents are selected from the group comprising a non-epoxy resin, a flexibilizer, a stabilizer, a flow promoter, a toughening agent, an accelerator, a core shell rubber, a flame retardant, a wetting agent, a colorant, a UV absorber, an antioxidant, an antimicrobial agent, a filler, a conducting particle, and a viscosity modifier. In some embodiments, the curable epoxy resin composition comprises at least about 15% by weight of biobinder.

In some embodiments, the method further comprises: (i) providing a bio-oil derived from animal waste; (ii) distilling the bio-oil to remove a light liquid fraction, wherein the distilling occurs at a vacuum pressure of between about 1 mm Hg and about 80 mm Hg while heating to a temperature of up to about 60° C.; and (iii) isolating a biobinder from the bio-oil. In some embodiments, the curing comprises heating the curable green epoxy resin, optionally to a temperature of at least about 80° C. or more for a period of time.

In some embodiments, the presently disclosed subject matter provides a prepreg comprising: (a) one or more epoxy resin component; (b) a biobinder isolated from a bio-oil produced from animal waste, optionally beef manure, dairy manure, swine manure, sheep manure, poultry manure, or a combination thereof; and (c) a fiber reinforcement, comprising one or more fibers and wherein the fiber reinforcement is in contact with one or both of (a) and (b). In some embodiments, the fiber reinforcement comprises one or more of glass, carbon or aramid fibers. In some embodiments, the presently disclosed subject matter provides a composite material comprising the cured prepreg.

It is an object of the presently disclosed subject matter to provide a curable epoxy resin composition, related compositions, and methods of making the compositions.

An object of the presently disclosed subject matter having been stated hereinabove, and which is achieved in whole or in part by the presently disclosed subject matter, other objects will become evident as the description proceeds when taken in connection with the accompanying drawings as best described herein.

DETAILED DESCRIPTION

Figure 1:
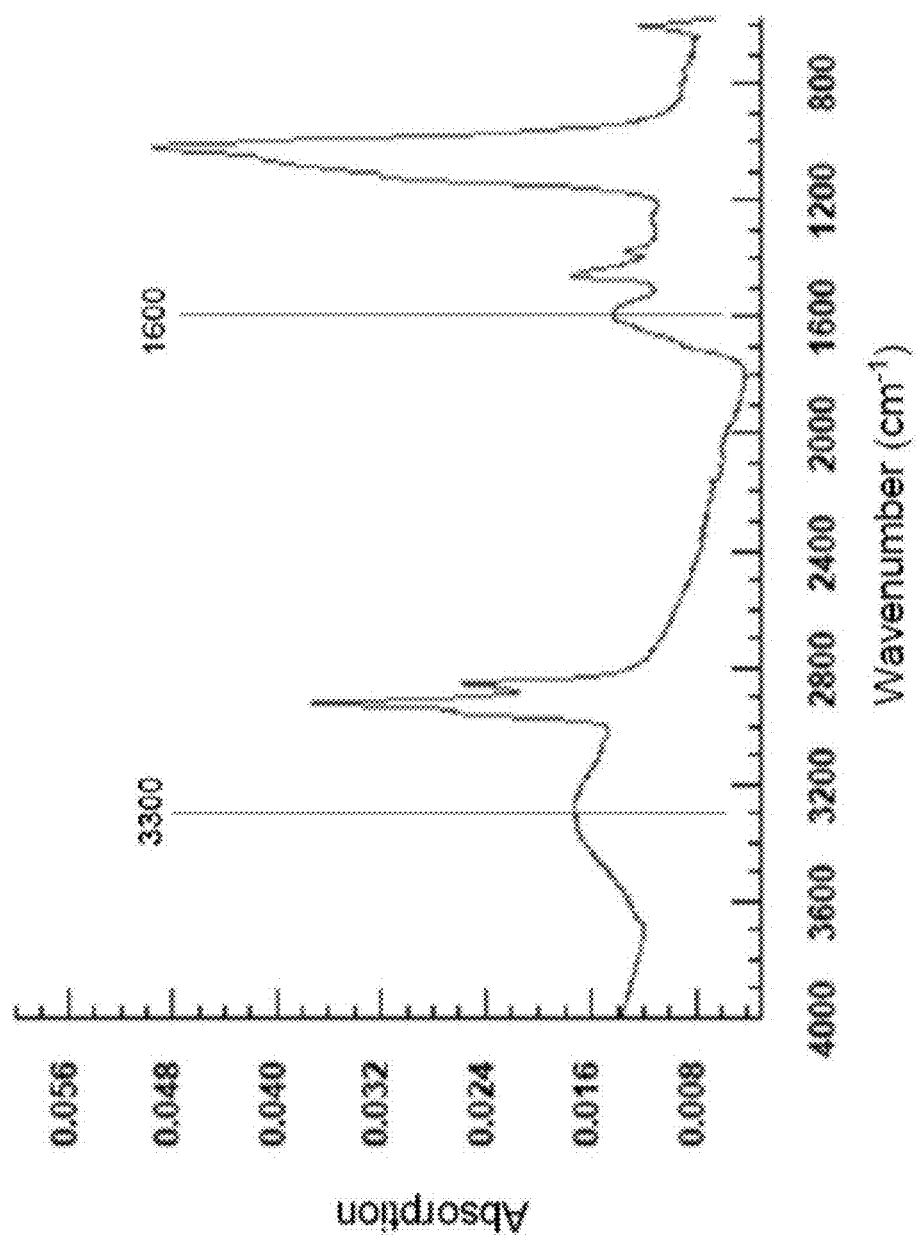
FIG. 1 is a graph showing the Fourier-transform infrared spectroscopy (FTIR) spectrum of biobinder isolated from swine manure as disclosed herein.

The presently disclosed subject matter will now be described more fully. The presently disclosed subject matter can, however, be embodied in different forms and should not be construed as limited to the embodiments set forth herein below and in the accompanying Examples. Rather, these embodiments are provided so that this disclosure will be thorough and complete, and will fully convey the scope of the embodiments to those skilled in the art.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

I. Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a", "an", and "the" refer to "one or more" when used in this application, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or."

As used herein "another" can mean at least a second or more.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed subject matter can include the use of either of the other two terms.

Unless otherwise indicated, all numbers expressing quantities of weight, mass, volume, time, activity, percentage (%), and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about", when referring to a value is meant to encompass variations of in one example ±20% or ±10%, in another example ±5%, in another example ±1%, and in still another example ±0.1% from the specified amount, as such variations are appropriate to perform the disclosed methods.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The terms "hydroxyl" and "hydroxyl" as used herein refer to the —OH group. In some embodiments, a hydroxyl group can be directly attached to an aromatic group, e.g., a phenyl group, and can also be referred to as a "phenol."

The terms "carboxylate" and "carboxylic acid" as used herein refer to the group —C(=O)OH (also depicted as —COOH) and the deprotonated form thereof (i.e., C(=O)O$^-$).

The term "amino" as used herein refers to the group —NH$_2$.

The terms "epoxy", "epoxide" and "oxirane" as used herein refer to chemical functional group comprising a three-membered ring structure comprising one oxygen atom and two carbon atoms that are bonded together via single bonds. Thus, an epoxy group can have the structure:

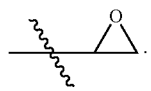

As used herein, a "monomer" refers to a molecule that can undergo polymerization, thereby contributing constitutional units, i.e., an atom or group of atoms, to the essential structure of a macromolecule.

As used herein, a "macromolecule" refers to a molecule of high relative molecular mass, the structure of which comprises the multiple repetition of units derived from molecules of low relative molecular mass, e.g., monomers and/or oligomers.

An "oligomer" refers to a molecule of intermediate relative molecular mass, the structure of which comprises a small plurality (e.g., 2, 3, 4, 5, 6, 7, 8, 9, or 10) of repetitive units derived from molecules of lower relative molecular mass.

A "polymer" refers to a substance comprising macromolecules. In some embodiments, the term "polymer" can include both oligomeric molecules and molecules with larger numbers (e.g., >10, >20, >50, >100) of repetitive units. In some embodiments, "polymer" refers to macromolecules with at least 10 repetitive units.

The term "resin" as used herein generally refers to a polymeric compound, oligomeric compound, monomeric compound, or a mixture thereof that can undergo further polymerization and/or crosslinking (which can be referred to as "curing") to provide a three-dimensional polymeric matrix. Resins can be liquid or solid. In some embodiments, the resin is a "thermoset resin." The most frequently used thermosetting resins include, but are not limited to, polyesters, epoxies, phenolics, vinyl esters, polyurethanes, silicones, polyamides, and polyamide-imides.

The term "epoxy resin component" as used herein refers to a monomer, dimer, oligomer or polymer comprising one or more reactive epoxy functional groups (e.g., that are polymerizable by a ring opening reaction). Typically, the epoxy resin component is a "polyepoxide" or "multifunctional" in that it contains at least two epoxy groups per molecule. The backbone of the epoxy resin component can be of any type (e.g., aliphatic, heterocyclic, cycloaliphatic, and/or aromatic), and substituent groups thereon can be any group not having a nucleophilic group or electrophilic group (such as an active hydrogen atom) which is reactive with an oxirane ring. Exemplary substituent groups include halogens, ester groups, ethers, sulfonate groups, siloxane groups, nitro groups, amide groups, nitrile groups, and phosphate groups.

The functionality of an epoxy resin component is the number of reactive epoxy groups per molecule that are available to react and cure to form a cured structure. For example, a Bisphenol A epoxy resin has a functionality of 2, while certain glycidyl amines can have a functionality of more than 4. In some embodiments, the epoxy resin component is a difunctional epoxy resin component, a trifunctional epoxy resin component, a tetrafunctional epoxy resin component, or a combination thereof. Suitable multifunctional epoxy resin components, by way of example and not limitation, include those based upon: phenol and cresol epoxy novolacs, glycidyl ethers of phenol-aldehyde adducts; glycidyl ethers of dialiphatic diols; diglycidyl ether; diethylene glycol diglycidyl ether; aromatic epoxy resins; dialiphatic triglycidyl ethers, aliphatic polyglycidyl ethers; epoxidised olefins; brominated resins; aromatic glycidyl amines; heterocyclic glycidyl imidines and amides; glycidyl ethers; fluorinated epoxy resins or any combination thereof. In some embodiments, the epoxy resin component or components make up about 40 to about 65 weight percent of a curable resin composition.

The reactivity of an epoxy resin composition is indicated by its epoxide content or epoxy equivalent weight (EEW). This is commonly expressed as the epoxide number, which is the number of epoxide equivalents in 1 kg of resin (Eq./kg), or as the equivalent weight, which is the weight in grams of resin containing 1 mole equivalent of epoxide (g/mol). One measure can be simply converted to another:

Equivalent weight (g/mol)=1000/epoxide number (Eq./kg). In some embodiments, the epoxy equivalent weight or epoxide number can be used to estimate or determine the amount of curing agent/hardener to use when curing an epoxy resin composition.

The term "curable", when used herein in connection with, for example, a resin composition or a prepreg, is intended to cover materials that have not undergone any substantial curing reaction. In some embodiments, the term "curable" can also include compositions that have undergone partial curing, such as B-staging or another partial curing process. In some embodiments, after storage at room temperature for any given period of time, a resin is considered to be curable if the extent of reaction of the resin is less than 5%, less than 10%, less than 15%, less than 20% or less than 25%. The extent of reaction is also referred to as the "degree of reaction". The extent of reaction of a resin composition can be determined by using differential scanning calorimetry (DSC) to determine the heat release ($\Delta H_0$) of the resin immediately after preparation (time=0) and then determining the residual heat release ($\Delta H_R$) after a certain time of exposure at room temperature. The extent of reaction can be calculated as $\alpha=(\Delta H_R/\Delta H_0)\times 100$. According to the presently disclosed subject matter, an "out-time" or "shelf-life" of 6 weeks at room temperature means that a curable resin composition or prepreg remains uncured after storage at room temperature for 6 weeks such that the extent of reaction is less than 5%. The term "cured" means that the extent of reaction is over 95%.

Alternatively, the term "curable" can refer to a resin composition that has not reached its gel point. As used herein, a "gel point" of resin (or resin mixture) refers to the combination of time and temperature at which the resin no longer has the ability to flow, e.g., when the material changes in an irreversible way from a viscous liquid state to a solid state during the curing process. As is familiar to those of ordinary skill in the art, the gel point can be determined a variety of ways and is generally defined as the point in dynamic rheology measurement where tan δ (wherein δ is the phase lag between stress and strain in viscoelastic materials; tan δ=G'/G") becomes frequency independent or when the G'=G" crossover occurs (where G' is storage modulus, generally describing the elastic properties; G" is the loss modulus generally describing the viscous properties of viscoelastic materials). The gel point can also be calculated based on the known chemistry of the reactants. For example, in some epoxy resin systems, gelation occurs at about 50% conversion, that is, when 50% of the epoxy resin composition is cured. Beyond the gel point, on-going chemical reactions can increase the density of cross-linking, thereby curing the polymer.

"B-stage" means at least partial cure of at least one component in a resin mixture, provided that all components are not fully cured (i.e., that the extent of reaction is less than 95%); such a composition comprises monomeric and polymeric materials.

As used herein, the term "room temperature" is considered to be any temperature between about 15° C. and about 25° C. (i.e., about 15, 16, 17, 18, 19, 20, 21, 22, 23, 24, or about 25° C.). Typically, an uncured resin composition will be stored at temperatures of between about 18° C. and about 24° C. However, in some embodiments, an uncured resin composition or prepreg is stored at a temperature below room temperature, e.g., 15° C. or less, 10° C. or less, 5° C. or less, 0° C. or less, -10° C. or less or -20° C. or less.

As used herein, the "out-time" or "shelf-life" of a curable resin composition is the length of time that the resin composition can be exposed to ambient conditions before undergoing an unacceptable degree of curing which can adversely affect important resin properties, such as viscosity and tack. The out-time of epoxy resin at room temperature can vary widely depending upon a variety of factors, including, but not limited to, the particular resin component or components being used and/or by the types and amounts of curative agents that are included in the resin composition. In some embodiments, the resin out-time can be tailored or selected to be sufficiently long to allow storage, transport, normal handling, lay-up and molding operations to be accomplished without the resin undergoing unacceptable levels of curing.

Similarly, the term "storage stable" and like terms refer to resin compositions that do not gel or solidify, but rather remain liquid and at viscosities suitable for application to fiber reinforcement or a solid surface over a long period of time, for example, for a period of more than three (3) months at ambient conditions (e.g., room temperature and humidity).

The term "prepreg" or "pre-impregnated composite material" as used herein refers to a fibrous layer or layers impregnated or coated with a curable resin composition or components thereof. In some embodiments, the fibrous layer is partially or fully impregnated with a mixture comprising one or more epoxy resin component and biobinder.

As used herein, "bio-oil" refers to an oil produced from animal waste comprising beef, dairy, swine, poultry, sheep manures, or combinations thereof. The oil is typically an energy-dense crude oil that is similar to petroleum extracts.

As used herein, "black water" refers to the aqueous side-product from the production of bio-oil via the thermochemical conversion of animal waste. Black water contains nutrients, but no pathogens, and has been identified as a useful fertilizer.

As used herein, "bio-char" refers to the insoluble organic material isolated from the production and post-processing of the bio-oil, as described herein. Typically, bio-char contains nutrients, including but not limited to carbon, metals, sand solid minerals comprising, amongst others, elements such as nitrogen, phosphorus, potassium, and calcium.

As used herein "Light Liquid Fraction" refers to liquid compounds within bio-oil that have relatively low boiling point at 3 mm mercury (Hg), generally up to 60° C. The Light Liquid Fraction typically contains olefin compounds and is usually an odorous fraction.

As used herein "Heavy Liquid Fraction" refers to liquid compounds within bio-oil that have mid-range boiling points at 3 mm Hg, typically over 60° C., generally from 60° C. to 100° C. and from 100° C. to 160° C. These compounds are liquid at room temperature and have adhesion characteristics to certain surfaces (substrates). They have apparent dynamic viscosity of up to about 0.5 cP at 135° C., generally between about 0.1 cP and about 0.5 cP. This fraction can have a slight sulfurous odor. The Heavy Liquid Fraction can be isolated as a series of sub-fractions, for example, a fraction containing hydrocarbons with a high concentration of amide groups, for example at least about 5% or at least about 10%, or at least about 15% by weight amide containing compounds. Alternately, one Heavy Liquid Fraction contains between about 10% and about 20% amide containing compounds. Alternately a Heavy Liquid Fraction contains a low concentration of amide groups, for example no more than about 10% amide-containing compounds or no more than about 5% amide-containing compounds or nor more than about 2% amide containing compounds. The isolation of these Heavy Liquid sub-fractions depends on the isolation methods used, as disclosed in U.S. Pat. No. 9,637,615, incorporated herein by reference in its entirety.

As used herein, "bio-residue" refers to a sticky material, typically dark brown to black in color, that is solid at room temperature with penetration grade between (25-60) at 25° C. Typically, the bio-residue is non-odorous at room temperature and has a slight sulfurous odor at elevated temperatures. Generally, bio-residue contains compounds that are highly polar, have low aromaticity, including some olefinic compounds, and those with a lower molecular weight.

"Thermochemical conversion" or "thermochemical liquefaction", as used herein, refer to a process for converting a liquid slurry of biomass and organic materials to hydrocarbon oils and byproducts using high pressure (typically between about 15 MPa and about 20 MPa) and temperature (typically up to about 350° C.). By-products can include solids and an aqueous fraction. The quantity and quality of the end-products are typically dependent upon the reactor system and the feedstock characteristics. For example, when the feedstock is animal manure, the quantity and quality of the end-products can vary depending upon factors including, but not limited to, the type of animal producing the manure, the animal's diet, the season during which the manure is produced, and the like.

The term "green" as used herein in reference to an epoxy resin composition or a cured resin, refer to a composition that is more environmentally friendly than a traditional epoxy resin. For example, a green epoxy resin composition can be prepared from one or more starting materials that are bio-renewable and/or that are bio-degradable or compostable.

II. Green Epoxy Resin Compositions and Kits

In some embodiments, the presently disclosed subject matter provides a more environmentally friendly (or "green") epoxy resin. In some embodiments, at least a portion of the material used to prepare the presently disclosed epoxy resin can be from a renewable, non-petroleum-based source. The presently disclosed subject matter is based, in one aspect, on the finding that materials isolated from biomass-derived bio-oils can include compounds having chemical functional groups, such as amines, carboxylates, and hydroxyl groups, that can react with epoxide groups. Thus, in some embodiments, these materials can be used as a curing agent or hardener in epoxy resin systems to crosslink epoxy resins. Accordingly, in some embodiments, the presently disclosed subject matter provides an epoxy resin composition that comprises a biobinder (BB) derived from biomass (e.g., a bio-oil derived from animal manure). In some embodiments, the BB can take the place of some or all of the epoxy curing agent of a traditional epoxy resin system. In some embodiments, the BB can take the place of a portion of the epoxy resin components of a traditional epoxy resin system. As described further hereinbelow, in some embodiments, cured materials prepared from the presently disclosed green epoxy resin compositions can have similar mechanical properties to those prepared from a traditional epoxy resin system, i.e., a composition prepared from the same epoxy resin components, but not including BB.

In some embodiments, the presently disclosed subject matter provides a curable epoxy resin composition comprising: (a) an epoxy resin component; and (b) BB isolated from a bio-oil. In some embodiments, the bio-oil is produced from animal waste. In some embodiments, the animal waste is cattle (e.g., beef cattle or dairy cattle) manure, swine manure, poultry manure, sheep manure, or a combination thereof. In some embodiments, the animal waste comprises swine manure.

In some embodiments, the animal waste can comprise at least about 2.5%, 5%, 10%, 15%, 20%, 25%, or at least about 30% solid manure waste, e.g., as opposed to liquid waste, straw, or grass. The liquid component of the animal waste can be removed or reduced by a variety of methods, including, but not limited to, filtration, centrifugation, condensation, gravimetry, and other methods familiar to those of skill in the art for separating solids and liquids. In some embodiments, the animal waste can be processed through a digester leading to side products that can be used as a feedstock for the production of bio-oil, for example, a centroid from a methane digester and/or glycerol from bio-diesel production.

Methods of converting biomass to bio-oil are known in the art. In some embodiments, the bio-oil is produced by chemical reactions in the presence of a catalyst, including, but not limited to, gasification, anaerobic digestion or fast pyrolysis. In some embodiments, the bio-oil is produced by thermochemical liquefaction (TCC) of animal waste. TCC is a chemical reforming process using heat and pressure in the absence of oxygen to break down long-chain organic compounds into short chain molecules yielding a bio-oil. TCC can be conducted using a high-pressure batch reactor (e.g., an autoclave). Suitable conditions for TCC of swine, beef, dairy and poultry manure are described, for example, in U.S. Pat. No. 9,637,615, incorporated herein by reference in its entirety.

Conversion of animal waste to bio-oil via TCC can produce an aqueous side product, referred to as "black water", which can contain agricultural nutrients and be used as a soil fertilizer. Typically, the black water can be removed via filtration. The remaining sticky residue produced by TCC can be treated with a solvent (e.g., acetone or a mixture of acetone and toluene) to dissolve the bio-oil, leaving behind an insoluble residue referred to as "bio-char." Then, the solvent can be removed from the dissolved bio-oil. Various fractions of the bio-oil, e.g., the light liquid fraction, the heavy liquid fraction, and the bio-residue can be isolated separately or in combination via methods described in U.S. Pat. No. 9,637,615 to provide the BB for the presently disclosed resin compositions.

Typically, the BB used in the presently disclosed subject matter can comprise a slurry-like mixture comprising both solid and liquid phases. In some embodiments, the BB comprises a combination of the heavy liquid fraction and the bio-residue remaining from a bio-oil after the light liquid fraction is removed. Removal of the light liquid fraction can be performed via distillation at a vacuum pressure of between about 1 mm Hg and about 80 mm Hg, while heating to a temperature of up to about 60° C. In some embodiments, the heating rate is between about 15° C. per hour and about 30° C. per hour. In some embodiments, the BB can be isolated by vacuum distillation of the crude bio-oil to remove or substantially remove compounds having a boiling point at 3 mm Hg of 60° C. or less. By "substantially remove" is meant that at least about 95, 96, 97, 98, or about 99 wt. % or volume % of the originally present compounds having a boiling point at 3 mm Hg of 60° C. or less are removed. Alternatively, in some embodiments, the BB can comprise the heavy liquid fraction alone (or a sub-fraction thereof) or the bio-residue alone.

In some embodiments, the viscosity of the BB can be controlled by monitoring the pot liquor (i.e., the material remaining in the still pot) of the vacuum distillation (e.g., at ten- or fifteen-minute time increments) such that the viscosity is not allowed to exceed about 5 centipoise (cP) at 135° C. In some embodiments, the viscosity is not allowed to exceed about 1 cP. In some embodiments, the viscosity is not allowed to exceed about 0.4 or about 0.5 cP. In some embodiments, the BB has a viscosity of between about 0.01 cP and about 5 cP at 135° C. In some embodiments, the BB has a viscosity of between about 0.01 cP and about 0.4 cP (e.g., about 0.01, 0.05, 0.1, 0.2, 0.3, or 0.4 cP) at 135° C. In some embodiments, the BB has a viscosity of between about 0.4 cP and about 1.0 cP (e.g., about 0.4, 0.5, 0.6, 0.7, 0.8, 0.9, or about 1.0 cP) at 135° C. In some embodiments, the BB has a viscosity of about 2 cP, about 3 cP, about 4 cP, or about 5 cP at 135° C.

In some embodiments, the BB comprises or consists of a heavy liquid fraction comprising at least about 5% by weight of amide-containing compounds, optionally containing about 10% to about 20% by weight of amide-containing compound. In some embodiments, the BB comprises or consists of a heavy liquid fraction comprising up to about 5% by weight of amide-containing compounds, optionally about 1% to about 5% by weight of amide-containing compounds.

In some embodiments, the heavy liquid fraction and the bio-residue can be separated by distilling a mixture of heavy liquid fraction and bio-residue under vacuum pressure of between about 1 mm Hg and about 80 mm Hg while heating to a temperature ranging from between about 60° C. and about 100° C.; or while heating to a temperature ranging from between about 100° C. and about 160° C. while not allowing the viscosity of the bio-residue (i.e., the "pot liquor") to exceed about 1 centipoise (cP) at 135° C.

As noted hereinabove, the term "epoxy resin component" as used herein generally refers to a compound comprising an epoxy functional group:

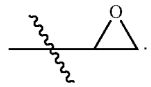

Suitable epoxy resin components according to the presently disclosed subject matter generally can have more than one epoxy group per molecule (i.e., be multifunctional). Suitable epoxy resin components include, for example, those that are saturated or unsaturated, aliphatic, cycloaliphatic, or heterocyclic.

Suitable epoxy resin components can be in liquid and/or solid form. In some embodiments, the epoxy resin component or components are liquid rather than solid and have a molecular weight of from 350 to 4,000, such as from 800 to 2,000. In some embodiments, the epoxy resin component has an epoxide equivalent weight of from 100 to 2,000, such as from 200 to 800; and have a reactivity of two. In some embodiments, the epoxy resin components used can also contain some monomer units having only one oxirane group.

Examples of epoxy resin components that can be part of the presently disclosed compositions include, but are not limited to, polyglycidyl ethers of mononuclear polyhydric phenol compounds, such as hydroquinone, resorcin, pyrocatechol, and phloroglucinol; polyglycidyl ethers of polynuclear polyhydric phenol compounds, such as dihydroxynaphthalene, biphenol, methylenebisphenol (i.e., Bisphenol F), methylenebis(ortho-cresol), ethylidenebisphenol, isopropylidenebisphenol (i.e., Bisphenol A), isopropylidenebis(ortho-cresol), tetrabromobisphenol A, 1,3-bis(4-hydroxycumyl-benzene), 1,4-bis(4-hydroxycumylbenzene), 1,1,3-tris(4-hydroxyphenyl)butane, 1,1,2,2-tetra(4-hydroxyphenyl)ethane, thiobisphenol, sulfobisphenol, oxybisphenol, phenol novolac, ortho-cresol novolac, ethylphenol novolac, butylphenol novolac, octylphenol novolac, resorcin novolac, and terpenediphenol; polyglycidyl ethers of ethylene oxide and/or propylene oxide adducts of the above-mentioned mono- or polynuclear polyhydric phenol compounds; polyglycidyl ethers of hydrogenation products of the above-mentioned mononuclear polyhydric phenol compounds; polyglycidyl ethers of polyhydric alcohols, such as ethylene glycol, propylene glycol, butylene glycol, hexanediol, polyglycol, thiodiglycol, glycerol, trimethylolpropane, pentaerythritol, sorbitol, and bisphenol A ethylene oxide adducts; homo- or copolymers of glycidyl esters of aliphatic, aromatic or alicyclic polybasic acids, such as maleic acid, fumaric acid, itaconic acid, succinic acid, glutaric acid, suberic acid, adipic acid, azelaic acid, sebacic acid, dimer acid, trimer acid, phthalic is acid, isophthalic acid, terephthalic acid, trimellitic acid, trimesic acid, pyromellitic acid, tetrahydrophthalic acid, hexahydrophthalic acid, and endomethylenetetrahydrophthalic acid, and glycidyl methacrylate; epoxy compounds having a glycidylamino group, such as N,N-diglycidylaniline and bis(4-(N-methyl-N-glycidylamino)phenyl)methane; epoxy compounds of cyclic olefin compounds, such as vinylcyclohexene diepoxide, dicyclopentanediene diepoxide, 3,4-epoxycyclohexylmethyl-3,4-epoxycyclohexane-carboxylate, 3,4-epoxy-6-methylcyclohexylmethyl-6-methylcyclohexanecarboxylate, and bis(3,4-epoxy-6-methylcyclohexylmethyl)adipate; epoxidized conjugated diene polymers, such as epoxidized polybutadiene and epoxidized styrene-butadiene copolymers; and heterocyclic compounds, such as triglycidyl isocyanurate. In some embodiments, these epoxy resins can be internally crosslinked by an isocyanate-terminated prepolymer.

Epoxy resin components suitable for use according to the presently disclosed subject matter are commercially available and include, but are not limited to, Bisphenol A-epichlorohydrin epoxy resins available from Miller-Stephenson Chemicals (Danbury, Conn., United States of America), under the product name EPON™, including the epoxy resins EPON™ 1001, EPON™ 834, and EPON™ 828; Bisphenol F-epichlorohydrin epoxy resins, available from Miller-Stephenson Chemicals under the product name EPON™, including the epoxy resins EPON™ 861 and EPON™ 862; epoxy phenol novolac resins including the epoxy resin EPALLOY® 8250 from CVC Chemicals (Moorestown, N.J., United States of America), the epoxy resin Araldite® EPN 1139 from Ciba Geigy (Basel, Switzerland), and the epoxy resins DEN432 and DEN438 from Dow Chemical (Midland, Mich., United States of America). Suitable non-aromatic epoxy resin components that are commercially available include, but are not limited to, for example, hydrogenated cyclohexane dimethanol and diglycidyl ethers of hydrogenated Bisphenol A-type epoxide resin, such as: epoxy resins EPON™ 1510, EPON™ 4080E, HELOXY™ 107 and EPON 1513 (hydrogenated bisphenol A-epichlorohydrin epoxy resin) from Miller-Stephenson Chemical (Danbury, Conn., United States of America); the epoxy resin EPODIL™ 757 (cyclohexane dimethanol diglycidylether) from Evonik (Essen, Germany); the epoxy resins ARALDITE™ XUGY358 and PY327 from Hunstman Advanced Materials (Brewster, N.Y., United States of America); the epoxy resins AROFLINT® 393 and 607 from Reichold (Durham, N.C., United States of America) and the epoxy resin ERL4221 (3,4-Epoxycyclohexylmethyl-3',4'- epoxycyclohexane carboxylate) from Polysciences, Inc. (Warrington, Pa., United States of America). Other suitable non-aromatic epoxy resins include DER 732 (polyethylene glycol diglycidyl ether homopolymer) and DER 736 (dipropylene glycol diglycidyl ether) from Polysciences, Inc., (Warrington, Pa., United States of America).

In some embodiments, a combination of two or more epoxy resin components can be used. In some embodiments, the epoxy resin component is selected from the group including, but not limited to, an epichlorohydrin-bisphenol A epoxy resin, an epichlorohydrin-Bisphenol G epoxy resin, hydrogenated bisphenol A epichlorohydrin epoxy resins, glycidyl methacrylate resins, glycidyl esters, phenol novalac epoxy resins, resorcinol-modified epoxy resins, and combinations thereof. In some embodiments, the epoxy resin component comprises one or more of the group including epichlorohydrin, Bisphenol A, and Bisphenol F. In some embodiments, the epoxy resin component comprises the diglycidyl ether of Bisphenol F. In some embodiments, the epoxy resin component comprises or consists of the epoxy resin EPON™ 862.

In some embodiments, the curable epoxy resin composition comprises at least about 10% by weight (i.e., wt. %) BB. In some embodiments, the composition comprises at least about 15 wt. % or at least about 20 wt. % BB. In some embodiments, the composition comprises between about 15 wt. % and about 50 wt. % BB. In some embodiments, the composition comprises between about 20 wt. % and about 45 wt. % BB (e.g., about 20, 21, 22, 23, 24, 25, 26, 27, 28, 29, 30, 31, 32, 33, 34, 35, 36, 37, 38, 39, 40, 41, 42, 43, 44, and about 45 wt. % BB). In some embodiments, the curable epoxy resin composition comprises about 30 wt. % BB.

In some embodiments, the curable epoxy resin composition can include one or more additional components. In some embodiments, the one or more additional components can be performance enhancing or modifying agents known for use in epoxy resin systems such as, but not limited to, non-epoxy resins (e.g., non-epoxy thermoset resins), flexibilizers, stabilizers, flow promoters, toughening agents (e.g., toughing particles), accelerators (e.g., curing agent accelerators), core shell rubbers, flame retardants, wetting agents, coloring agents (e.g., a pigment or dye), UV absorbers, antioxidants, antimicrobial agents (e.g., an anti-fungal compound), fillers (e.g., an inorganic filler), conducting particle or particles, and viscosity modifiers. For example, curing agent accelerators known in the art include urea compounds. Specific examples of accelerators, which can be used alone or in combination, include N,N-dimethyl, N'-3,4-dichlorphenyl urea, N'-3-chlorophenyl urea, and N,N-(4-methyl-m-phenylene bis[N',N'-dimethylurea].

One method of increasing the tensile performance and resistance to damage of a cured material (e.g., a composite material) prepared by curing an epoxy resin composition is to include one or more thermoplastic materials in the curable epoxy resin composition. A variety of different thermoplastic materials in a variety of different forms have been used to toughen epoxy resins. For example, see U.S. Pat. No. 7,754,322, which is incorporated herein by reference in its entirety. Thus, in some embodiments, the one or more additional components includes a toughening agent. Exemplary toughening agents/particles include any of the following thermoplastics, either alone or in combination: polyamides, copolyamides, polyimides, aramids, polyketones, polyetheretherketones, polyesters, polyurethanes, polysulphones, polyethersulfones, high performance hydrocarbon polymers, liquid crystal polymers, PTFE, elastomers, and segmented elastomers. Suitable additional thermoplastic polymers for use as additional toughening agents include any of the following, either alone or in combination: polyether sulphone (PES), polyether ethersulphone (PEES), polyphenyl sulphone, polysulphone, polyimide, polyetherimide, aramid, polyamide, polyester, polyketone, polyetheretherketone (PEEK), polyurethane, polyurea, polyarylether, polyarylsulphides, polycarbonates, polyphenylene oxide (PPO) and modified PPO.

Additionally or alternatively, in some embodiments, an inorganic filler can be employed in the curable epoxy resin composition to improve the dimensional stability and mechanical strength of the resulting cured material prepared from the curable resin. Examples of suitable inorganic fillers include, for instance, silica (fused, non-fused, porous, or hollow), aluminum oxide, aluminum hydroxide, magnesium oxide, magnesium hydroxide, calcium carbonate, aluminum nitride, boron nitride, aluminum silicon carbide, silicon carbide, sodium carbonate, titanium dioxide, zinc oxide, zirconium oxide, quartz, diamond powder, diamond-like powder, graphite, magnesium carbonate, potassium titanate, mica, boehmite, zinc molybdate, ammonium molybdate, zinc borate, calcium phosphate, talc, talc, silicon nitride, mullite, kaolin, clay, etc. In some embodiments, an inorganic filler can constitute from about 0.5 to about 40 wt. %, in some embodiments from about 1 wt. % to about 35 wt. %, and in some embodiments, from about 5 wt. % to about 30 wt. % of the curable resin composition. In some embodiments, inorganic fillers (e.g., silica, aluminum nitride, etc.) can be present in an amount of no more than about 0.5 wt. %, in some embodiments no more than about 0.1 wt. %, and in some embodiments, from about 0.001 wt. % to about 0.1 wt. % of the polymer composition.

Suitable conducting particles, by way of example and not limitation, include any of the following either alone or in combination: silver, gold, copper, aluminum, nickel, conducting grades of carbon, buckminsterfullerene, carbon nanotubes and carbon nanofibers. Metal-coated fillers can also be used, for example nickel coated carbon particles and silver coated copper particles.

In some embodiments, a non-epoxy resin component can be included in the curable resin composition. In some embodiments, the non-epoxy resin component can be another type of thermoset resin component, such as, but not limited to, resins of phenol formaldehyde, urea-formaldehyde, 1,3,5-triazine-2,4,6-triamine (Melamine), bismaleimide, vinyl ester resins, benzoxazine resins, phenolic resins, polyesters, cyanate ester resins, epoxide polymers, or any combination thereof. In some embodiments, the curable resin composition comprises a non-epoxy thermosetting resin or resins in an amount of up to 10 wt. % based on the total weight of the epoxy component.

In some embodiments, the BB is the only curing agent in the curable epoxy resin composition. Thus, the addition of an additional curing agent(s) and/or catalyst(s) to the curable epoxy resin composition is optional. However, the use of such can increase the cure rate and/or reduce the cure temperatures of the curable resin composition, if desired. Thus, in some embodiments, the curable epoxy resin composition can also include a more traditional epoxy resin curing agent/hardener, which can be selected from the group including, but not limited to amines (e.g., polyamines and aromatic polyamines), imidazoles, acids, acid anhydrides, phenols, alcohols, and thiols (e.g., polymercaptans). In some embodiments, the traditional curing agent is a polyamine compound selected from the group comprising diethylenetriamine (DETA), triethylenetetramine (TETA), tetraethylenepentamine (TEPA), ethyleneamine, aminoethylpiperazine (AEP), dicyanamide (Dicy), diethyltoluenediamine (DETDA), dipropenediamine (DPDA), diethyleneaminopropylamine (DEAPA), hexamethylenediamine, N-aminoethylpiperazine (N-AEP), menthane diamine (MDA), isophoronediamine (IPDA), m-xylenediamine (m-XDA) and metaphenylene diamine (MPDA). In some embodiments, the additional amine curing agent is selected from the group including 3,3'- and 4-,4'-diaminodiphenylsulphone (DDS); methylenedianiline; bis(4-amino-3,5-dimethylphenyl)-1,4-diisopropylbenzene; bis(4-aminophenyl)-1,4-diisopropylbenzene; 4,4'methylenebis-(2,6-diethyl)-aniline (MDEA); 4,4'methylenebis-(3-chloro, 2,6-diethyl)-aniline (MCDEA); 4,4'methylenebis-(2,6-diisopropyl)-aniline (M-DIPA); 4,4'methylenebis-(2-isopropyl-6-methyl)-aniline (M-MIPA); 4-chlorophenyl-N,N-dimethyl-urea; 3,4-dichlorophenyl-N,N-dimethyl-urea, and dicyanodiamide. Bisphenol chain extenders, such as Bisphenol-S or thiodiphenol, can also be useful as additional curing agents for epoxy resins. Suitable additional traditional curing agents further include anhydrides, particularly polycarboxylic anhydrides, such as nadic anhydride, methylnadic anhydride, phthalic anhydride, tetrahydrophthalic anhydride, hexahydrophthalic anhydride, methyltetrahydrophthalic anhydride, endomethylenetetrahydrophtalic anhydride, or trimellitic anhydride.

In some embodiments, the curable resin composition can include one or more catalyst(s) to accelerate curing. Suitable catalysts are well known in the art and include Lewis acids or bases. A Lewis acid is a chemical species that has an empty orbital that can accept an electron pair from a Lewis base to form a Lewis adduct. A Lewis base is a chemical species that has a filled orbital containing an electron pair that is not involved in binding. Specific examples include compositions comprising trimethyl borane and boron trifluoride, such as the etherates or amine adducts thereof (for instance the adduct of boron trifluoride and ethylamine).

Typically, the presently disclosed curable adhesive compositions are cured using heat, e.g., by heating the composition to a temperature sufficient for functional groups in the BB to react with epoxy groups of the epoxy resin component, thereby crosslinking the composition. Typically, the curing temperature is higher than room temperature. In some embodiments, the curing temperature is at least about 40° C., above about 60° C., or above about 80° C. In some embodiments, the curing temperature is between about 80° C. and about 180° C. In some embodiments, the curing temperature is at least about 100° C., or at least about 120° C. In some embodiments, multiple curing temperatures are used. In some embodiments, the highest curing temperature is at least about 100° C. or at least about 120° C.

In some embodiments, the curable resin composition can remain uncured when stored under ambient conditions (e.g., room temperature and humidity). For example, in some embodiments, the presently disclosed curable resin composition is "storage stable" or has a "shelf-life", i.e., remains uncured and/or remains liquid or at viscosities suitable for application to substrate over a long period of time, for instance, for a period of more than three (3) months at ambient conditions (e.g., at a temperature of about 25° C. or less). In some embodiments, the curable resin composition has a shelf-life of up to about 6 weeks at ambient conditions. In some embodiments, the curable resin composition has a shelf-life for up to 6 months or more at reduced temperatures (i.e., a temperature colder than room temperature (e.g., less than about 20° C., less than about 10° C., less than about 5° C., less than about 0° C., less than about −5° C., less than about −10° C., less than about −15° C., or less than about −20° C.).

In some embodiments, the presently disclosed subject matter provides an article comprising a cured epoxy resin prepared by curing the curable epoxy resin comprising (a) an epoxy resin component; and (b) BB. For instance, the epoxy resin can be used as an adhesive, e.g., to prepare or repair an article comprising wood, a composite material (e.g., a fiber-reinforced polymeric material), ceramic, stone, cement, metal, a synthetic or natural polymer (e.g., a polyolefin, such as, but not limited to polyethylene, a polypropylene, a poly(alkyl acrylate), or a polystyrene); a polyester, a polyamide, rubber, etc.), leather, or cloth (e.g., a wool, cotton, nylon, or polyester fabric). In some embodiments, the epoxy resin composition can be used as a paint or protective coating material for a substrate, such as, but not limited to, a wood, laminate, tile, or ceramic flooring; a metal structure, e.g., a metal pipe, a metal fitting, a metal part on a vehicle (e.g., a car, boat or airplane), a metal can or other container, or a component in an electronic device or appliance (e.g., a washer or dryer); or a concrete surface. Thus, in some embodiments, the article is a substrate coated with a layer of the cured epoxy resin composition. In some embodiments, the cured resin is itself a structural component of an article or manufacture. In some embodiments, the article further comprises fiber reinforcement and the article is a structural component of a vehicle (e.g., a car, boat, or airplane), a piece of sports equipment (e.g., a golf club), or an orthopedic or prosthetic device. In some embodiments, the article is an intermediate layer of a circuit board in an electronic device, an insulting material in an electronic machine or a transformer, or a rotor blade for a wind turbine.

In some embodiments, it can be advantageous to store the BB and the epoxy resin component separately to delay premature curing and/or to allow for variation in the relative amounts of the BB and the epoxy resin component, e.g., to tailor the mechanical properties of a resulting cured resin to a particular end usage. In particular, in some embodiments, such as when the presently disclosed epoxy resin is used in multiple sequential applications that are envisioned to take place over a longer length of time (e.g., more than 3, 6, 9, or 12 months or more than one or more years), it can be advantageous to provide the materials to prepare the curable epoxy resin composition separately. Thus, in some embodiments, the presently disclosed subject matter provides a kit for providing the curable epoxy resin wherein the kit comprises: (a) a first sealable container containing one or more epoxy resin component; and (b) a second sealable containing BB isolated from a bio-oil (e.g., produced from animal waste, such as, but not limited to manure, such as but not limited to swine manure). In some embodiments, the first and/or the second sealable container are resealable.

In some embodiments, the kit can include one or more additional components, such as, but not limited to one or more epoxy resin performance enhancing or modifying agent and/or written material comprising instructions for use of the kit. In some embodiments, the one or more additional components are selected from the group including, but not limited to, a non-epoxy resin, a flexibilizer, a stabilizer, a flow promoter, a toughening agent, an accelerator, a core shell rubber, a flame retardant, a wetting agent, a colorant (e.g., a pigment or dye), a UV absorber, an antioxidant, an antimicrobial agent, a filler, a conducting particle, and a viscosity modifier. The one or more additional components can be provided in separate sealable containers or included in one of the first and second containers, e.g., pre-mixed with the epoxy resin component and/or the BB.

III. Methods of Preparing Green Epoxy Resin Compositions

In some embodiments, the presently disclosed subject matter provides methods of making green epoxy resin compositions and related materials. Thus, in some embodiments, the presently disclosed method comprises preparing a curable or cured epoxy composition using a renewable material. In some embodiments, the renewable material comprises BB isolated from bio-oil derived from biomass. In some embodiments, the presently disclosed subject matter provides a method of making a curable epoxy resin composition comprising (a) an epoxy resin composition; and (b) BB isolated from a bio-oil produced from animal waste. In some embodiments, the method comprises:

(i) providing a bio-oil derived from animal waste;

(ii) distilling the bio-oil to remove a light liquid fraction, wherein the distilling occurs at a vacuum pressure of between about 1 mm Hg and about 80 mm Hg while heating to a temperature of up to about 60° C.;

(iii) isolating a BB from the bio-oil; and (iv) contacting the BB with at least one epoxy resin component, thereby providing a curable epoxy resin composition.

In some embodiments, the presently disclosed subject matter provides a method of making a curable epoxy resin composition comprising (a) an epoxy resin composition; and (b) BB isolated from a bio-oil produced from animal waste comprising contacting the BB with at least one epoxy resin component, thereby providing a curable epoxy resin composition.

In some embodiments, the animal waste is cattle (e.g., beef cattle or dairy cattle) manure, swine manure, poultry manure, sheep manure, or a combination thereof. In some embodiments, the animal waste comprises swine manure. In some embodiments, the animal waste can comprise at least about 2.5%, 5%, 10%, 15%, 20%, 25%, or at least about 30% solid manure waste, e.g., as opposed to liquid waste, straw, or grass. Prior to step (i), the liquid component of the animal waste can be removed or reduced by a variety of methods, as described hereinabove, including, but not limited to, filtration, centrifugation, condensation, gravimetry, and other methods familiar to those of skill in the art for separating solids and liquids. In some embodiments, the animal waste can be processed through a digester leading to side products that can be used as a feedstock for the production of bio-oil, for example, a centroid from a methane digester and/or glycerol from bio-diesel production.

In some embodiments, the bio-oil is produced by chemical reactions in the presence of a catalyst, including, but not limited to, gasification, anaerobic digestion or fast pyrolysis. In some embodiments, the bio-oil is produced by thermochemical liquefaction (TCC) of the animal waste. TCC can be conducted suing a high-pressure batch reactor (e.g., an autoclave). As described hereinabove, suitable conditions for TCC of swine, beef, dairy and poultry manure are described, for example, in U.S. Pat. No. 9,637,615, incorporated herein by reference in its entirety. Conversion of animal waste to bio-oil via TCC can produce black water as a side product, which can be removed via filtration prior to step (ii). Also prior to step (ii), the sticky residue produced by TCC and remaining after removal of the black water can be treated with a solvent (e.g., acetone or a mixture of acetone and toluene), thereby dissolving the bio-oil, leaving behind an insoluble residue referred to as "bio-char." The solvent can be removed from the dissolved bio-oil via distillation or evaporation.

In some embodiments, step (ii) comprises removing the light liquid fraction. Step (ii) can also include removing some or all of the heavy liquid fraction. In some embodiments, the heating rate in step (ii) is between about 15° C./hour and about 30° C./hour.

In some embodiments, the viscosity of the BB isolated in step (iii) can be controlled by monitoring the pot liquor (i.e., the material remaining in the still pot) of the vacuum distillation (e.g., at ten- or fifteen-minute time increments) during step (ii) such that the viscosity is not allowed to exceed about 5 centipoise (cP) at 135° C. In some embodiments, the viscosity is not allowed to exceed about 3 cP or about 1 cP. In some embodiments, the viscosity is not allowed to exceed about 0.4 or about 0.5 cP.

In some embodiments, the heavy liquid fraction and the bio-residue can be separated in step (iii) by distilling the mixture of heavy liquid fraction and bio-residue remaining after step (ii) under vacuum pressure of between about 1 mm Hg and about 80 mm Hg while heating to a temperature ranging from between about 60° C. and about 100° C.; or while heating to a temperature ranging from between about 100° C. and about 160° C. while not allowing the viscosity of the bio-residue (i.e., the "pot liquor") to exceed about 1 centipoise (cP) at 135° C.

The epoxy component can be any epoxy component described above. In some embodiments, a combination of two or more epoxy resin components can be used. In some embodiments, the epoxy resin component is selected from the group including, but not limited to, an epichlorohydrin-bisphenol A epoxy resin, an epichlorohydrin-Bisphenol G epoxy resin, hydrogenated bisphenol A epichlorohydrin epoxy resins, glycidyl methacrylate resins, glycidyl esters, phenol novalac epoxy resins, resorcinol-modified epoxy resins, and combinations thereof. In some embodiments, the epoxy resin component comprises one or more of the group including epichlorohydrin, Bisphenol A, and Bisphenol F. In some embodiments, the epoxy resin component comprises the diglycidyl ether of Bisphenol F. In some embodiments, the epoxy resin component comprises or consists of the epoxy resin EPON™ 862.

In some embodiments, the contacting is performed such that the curable epoxy resin composition comprises at least about 10% by weight (i.e., wt. %) of BB. In some embodiments, the curable resin composition comprises at least about 15 wt. % or at least about 20 wt. % BB. In some embodiments, the curable resin composition comprises between about 15 wt. % and about 50 wt. % of BB. In some embodiments, the composition comprises between about 20 wt. % and about 45 wt. % of the BB (e.g., about 20, 21, 22, 23, 24, 25, 26, 27, 28, 29, 30, 31, 32, 33, 34, 35, 36, 37, 38, 39, 40, 41, 42, 43, 44, and about 45 wt. % BB). In some embodiments, the contacting is performed such that the resulting curable epoxy resin composition comprises about 30 wt. % BB.

In some embodiments, the contacting comprises one or more of sonication, stirring (e.g., magnetic stirring), and shaking. In some embodiments, the contacting further comprises degassing. In some embodiments, the contacting is performed at a temperature of between about room temperature and about 75° C. (e.g., about 20, 25, 30, 35, 40, 45, 50, 55, 60, 65, 70, or about 75° C.).

In some embodiments, one or more additional component can be added to the curable resin composition or to one or both of the BB or the epoxy resin composition prior to the contacting step. In some embodiments, the one or more additional components can be performance enhancing or modifying agents known for use in epoxy resin systems such as, but not limited to, a non-epoxy resin (e.g., non-epoxy thermoset resins), a flexibilizer, a stabilizer, a flow promoter, a toughening agent (e.g., toughing particles), an accelerator, core shell rubber, a flame retardant, a wetting agent, a coloring agent (e.g., a pigment or dye), a UV absorber, an antioxidant, an antimicrobial agent (e.g., an anti-fungal compound), a filler (e.g., an inorganic filler), a conducting particle or particles, and a viscosity modifier. In some embodiments, the biobinder is the only curing agent in the curable epoxy resin composition. However, if more rapid curing is desired, an additional curing agent and/or catalyst can be added to the curable resin composition (or to one or both of the BB or the epoxy resin component prior to the contacting step).

In some embodiments, the presently disclosed subject matter provides a method of preparing a cured green epoxy resin composition. Thus, in some embodiments, the curable epoxy resin prepared according to the method described above can be cured. Accordingly, in some embodiments, the presently disclosed subject matter provides a method of preparing a cured epoxy resin composition, the method comprising contacting biobinder isolated from a bio-oil produced from animal waste with at least one epoxy resin component, to provide a curable epoxy resin composition; and curing the curable epoxy resin composition. In some embodiments, the method further comprises, before the contacting step:

(i) providing a bio-oil derived from animal waste;

(ii) distilling the bio-oil to remove a light liquid fraction, wherein the distilling occurs at a vacuum pressure of between about 1 mm Hg and about 80 mm Hg while heating to a temperature of up to about 60° C.; and (iii) isolating a biobinder from the bio-oil.

Thus, in some embodiments, the presently disclosed subject matter provides a method comprising:

(i) providing a bio-oil derived from animal waste;

(ii) distilling the bio-oil to remove a light liquid fraction, wherein the distilling occurs at a vacuum pressure of between about 1 mm Hg and about 80 mm Hg while heating to a temperature of up to about 60° C.;

(iii) isolating a BB from the bio-oil;

(iv) contacting the BB with at least one epoxy resin component to provide a curable epoxy resin composition; and (v) curing the curable epoxy resin composition.

In some embodiments, the curing is performed by heating the curable epoxy resin composition, e.g. by heating the composition to a temperature sufficient for functional groups in the BB to react with epoxy groups of the epoxy resin component, thereby crosslinking the composition. Typically, the curing temperature is higher than room temperature. In some embodiments, the curing temperature is at least about 40° C., above about 60° C., or above about 80° C. In some embodiments, the curing temperature is between about 80° C. and about 180° C. In some embodiments, the curing temperature is at least about 100° C., or at least about 120° C. In some embodiments, multiple curing temperatures are used. In some embodiments, the highest curing temperature is at least about 100° C. or at least about 120° C.

In some embodiments, the curing is performed at a temperature of 60° C. or more or at a temperature of about 80° C. or more for a period of time. In some embodiments, the curing is performed in an oven (e.g., a convection oven) or an autoclave. In some embodiments, the curing is performed at a temperature of between about 80° C. and about 180° C. (e.g., about 80, 90, 100, 110, 120, 130, 140, 150, 160, 170, or about 180° C.). In some embodiments, the curing is performed at a temperature of at least about 85° C., 90° C., 95° C., 100° C., 105° C., 110° C., 115° C., 120° C., or about 125° C. The rate of heating during the curing can be between about 0.5° C. and about 5° C. per minute (e.g., about 0.5, 1.0, 1.5, 2.0, 2.5, 3.0, 3.5, 4.0, 4.5, or about 5.0° C./minute).

In some embodiments, the period of time (or the total cure time of the epoxy resin composition) is between about 1 minute and about 7 days. In some embodiments, the period of time is between about 15 minutes and about 48 hours. In some embodiments, the period of time is between about 1 hour and about 24 hours. In some embodiments, the total cure time is between about 10 hours and about 14 hours.

In some embodiments, the curing is performed at two or more temperatures, wherein the uncured epoxy resin composition is heated to a first temperature and held at the first temperature for a first period of time, and then, after the first period of time, heated to a second temperature and held at the second temperature for a second period of time. In some embodiments, the curing is performed at three or more temperatures, wherein the uncured epoxy resin composition is heated to a first temperature and held at that temperature for a first period of time, then heated to a second temperature and held at the second temperature for a second period of time, and heated to a third temperature and held at the third temperature for a third period of time.

In some embodiments, the first temperature is between about 80° C. and about 95° C.; the second temperature is between about 96° C. and about 115° C., and the third temperature is between about 116° C. and about 140° C. In some embodiments, the first temperature is about 82° C., the second temperature is about 104° C., and the third temperature is about 121° C. In some embodiments, each of the first, second, third, or additional period of time is between about 30 minutes and about 8 hours (e.g., about 0.5, 1.0, 1.5, 2.0, 2.5, 3.0, 3.5, 4.0, 4.5, 5.0, 5.5, 6.0, 6.5, 7.0, 7.5 or about 8.0 hours). In some embodiments, each period of time is between about 2 hours and about 6 hours. In some embodiments, each period of time is about 4 hours.

In some embodiments, the curable epoxy resin composition is cured in a mold. For example, the curable epoxy resin composition (e.g. from step (iv)) can be introduced into a mold prior to the curing step (e.g. step (v)) or the contacting step (e.g. step (iv)) can be conducted in a mold.

IV. Pre-Impregnated Fibers and Composite Materials

Pre-impregnated composite material (i.e., "prepreg") is used widely in the manufacture of composite parts, particularly for load-bearing or structure parts (e.g., in the automotive, marine, and aerospace industries). Such composite materials can also be used in the manufacture of sports equipment, orthopedic and/or prosthetic devices, as insulating materials for electronic machines or transformers, as intermediate layers for electronic circuit boards, and as rotor blades for wind turbines. Prepreg is a combination of uncured resin and fiber reinforcement, which is in a form that is ready for molding and curing into a final composite part. By pre-impregnating the fiber reinforcement with resin, the manufacturer can carefully control the amount and location of resin that is impregnated into the fiber network and insure that the resin is distributed in the network as desired. In some embodiments, the relative amount of fibers and resin in a composite part and the distribution of resin within the fiber network can have an effect on the structural properties of the part.

In some embodiments, the presently disclosed subject matter provides a pre-impregnated composite material (or "prepreg") comprising: (a) one or more epoxy resin component; (b) BB isolated from a bio-oil produced from biomass, such as animal waste, optionally beef manure, dairy manure, swine manure, sheep manure, poultry manure, or a combination thereof; and (c) a fiber reinforcement, comprising one or more fibers, wherein the fiber reinforcement is in contact with (e.g, coated or partially or fully impregnated with) one or both of (a) and (b). In some embodiments, the one or more epoxy resin component and the BB are mixed together prior to being contacted with the fiber reinforcement to form a curable epoxy resin composition. For example, in some embodiments, the epoxy resin component and the BB are mixed together, optionally at a temperature above room temperature (e.g., up to about 70° C. or about 75° C.), but below curing temperature, and then cooled to room temperature or below prior to application to a fiber reinforcement. Thus, in some embodiments, the prepreg comprises a curable epoxy resin composition comprising a BB isolated from a bio-oil produced from animal waste and a fiber reinforcement that is in contact with, such as being fully or partially impregnated with or coated with, the curable epoxy resin composition.

The epoxy resin component and the BB can be any epoxy resin component (or components) and any BB as described above. In some embodiments, the BB is isolated from a bio-oil produced from swine manure. In some embodiments, a combination of two or more epoxy resin components can be used. In some embodiments, the epoxy resin component is selected from the group including, but not limited to, an epichlorohydrin-bisphenol A epoxy resin, an epichlorohydrin-Bisphenol G epoxy resin, hydrogenated bisphenol A epichlorohydrin epoxy resins, glycidyl methacrylate resins, glycidyl esters, phenol novalac epoxy resins, resorcinol-modified epoxy resins, and combinations thereof. In some embodiments, the epoxy resin component comprises one or more of the group including epichlorohydrin, Bisphenol A, and Bisphenol F. In some embodiments, the epoxy resin component comprises the diglycidyl ether of Bisphenol F. In some embodiments, the epoxy resin component comprises or consists of the epoxy resin EPON™ 862.

In some embodiments, the curable epoxy resin composition formed from the epoxy resin component and the BB comprises at least about 10 wt. % BB. In some embodiments, the curable resin composition comprises at least about 15 wt. % or at least about 20 wt. % BB. In some embodiments, the curable resin composition comprises between about 15 wt. % and about 50 wt. % BB. In some embodiments, the composition comprises between about 20 wt. % and about 45 wt. % BB (e.g., about 20, 21, 22, 23, 24, 25, 26, 27, 28, 29, 30, 31, 32, 33, 34, 35, 36, 37, 38, 39, 40, 41, 42, 43, 44, and about 45 wt. % BB). In some embodiments, the curable epoxy resin composition comprises about 30 wt. % of the BB.

The fiber reinforcement can be any suitable fiber reinforcement known in the art for the preparation of prepregs and composite materials. The fiber reinforcement can include synthetic or natural fibers or any other form of material or combination of materials that can be combined with the resin composition to form a composite product. Exemplary fibers include, but are not limited to, glass, carbon, graphite, boron, ceramic metalized fibers, and aramid fibers (i.e., aromatic polyamide fibers, such as KEVLAR® fibers). In some embodiments, the fiber reinforcement comprises one or more of glass, carbon or aramid fibers.

The fibrous reinforcement can comprise cracked (i.e. stretch-broken) or selectively discontinuous fibers, or continuous fibers. The use of cracked or selectively discontinuous fibers can facilitate lay-up of the composite material prior to being fully cured and improve its capability of being shaped. The fibrous reinforcement can be in a woven, non-crimped, non-woven, unidirectional, or multi-axial textile structure form, such as quasi-isotropic chopped prepreg. The woven form can be selected from a plain, satin, or twill weave style. The non-crimped and multi-axial forms can have a number of plies and fiber orientations. Such styles and forms are well known in the composite reinforcement field, and are commercially available from a number of companies, including Hexcel Corporation (Stamford, Conn., United States of America).

In some embodiments, the fiber reinforcement comprises a multidirectional woven fabric or a unidirectional tape that contains fibers extending parallel to each other. The fibers are typically in the form of bundles of numerous individual fibers or filaments that are referred to as "tows". The fibers or tows can also be chopped and randomly oriented in the resin to form a non-woven mat of chopped unidirectional tape. This type of prepreg is referred to as a "quasi-isotropic chopped" prepreg. Quasi-isotropic chopped prepreg is similar to the more traditional non-woven fiber mat prepreg, except that short lengths of chopped unidirectional tape (chips) are randomly oriented in the mat rather than chopped fibers.

The uncured resin, or components thereof (i.e., the epoxy resin component and the biobinder) can be applied to the fiber reinforcement in accordance with any known prepreg manufacturing technique. The fiber reinforcement can be fully or partially impregnated with the curable epoxy resin composition. In some embodiments, the curable resin composition is applied to the fiber reinforcement as a separate film or layer, which is proximal to, and in contact with the fiber reinforcement.

In some embodiments, the prepreg of the presently disclosed subject matter is laid-up with other layers of materials, which can be, for example, other composite materials (e.g. other prepregs according to the presently disclosed subject matter or other prepregs) to produce a prepreg stack which can be cured to produce a fiber reinforced laminate. In some embodiments, the prepregs can be laid up with other layers, such as solid sheets, or laminates, or metal foils, such as steel or aluminum foil. In some embodiments, the prepregs are interspersed with such metal sheets or foils.

The prepreg is typically produced as a roll of prepreg and in view of the tacky nature of such materials, a backing sheet is generally provided to enable the roll to be unfurled at the point of use. Thus, in some embodiments, the prepreg further comprises a backing sheet on an external face. The backing sheet can comprise, for example, a polyolefin-based polymer material such as, but not limited to, a polyethylene or polypropylene based polymer.

In some embodiments, the curable epoxy resin composition or one of its components (i.e., the epoxy resin component or the biobinder) can include one or more additional components. In some embodiments, the one or more additional components can include a traditional epoxy curing agent or catalyst. In some embodiments, the additional component is an internal mold release agent. Other additional components that can be present include, but are not limited to, solvents or reactive diluents, colorants (e.g., dyes or pigments), antioxidants, preservatives, impact modifiers, non-fibrous particulate fillers including micron- and nano-particles, wetting agents and the like. In some embodiments, these additional components can be added to alter the viscosity of the uncured resin composition (or epoxy resin component and/or BB) and/or the tack of the uncured prepreg.

Ideally, the viscosity of the uncured resin composition can be low enough so that the resin components can be mixed completely and then impregnated thoroughly into the reinforcing fibers. The viscosity of the resin composition can also be high enough so that the resin composition or components do not flow to any substantial degree during storage or lay-up of the prepreg. In addition, the viscosity of the uncured resin must remain at a suitable level during storage in order for the cured composite part to exhibit desired levels of strength and/or damage tolerance.

The stickiness or tackiness of an uncured prepreg is commonly referred to as "tack". The tack of uncured prepreg is a consideration during lay-up and molding operations. Prepreg with little or no tack can be difficult to form into laminates that can be molded to form composite parts. Conversely, prepreg with too much tack can be difficult to handle and also difficult to place into the mold. It is desirable that the prepreg have the right amount of tack to insure easy handling and good laminate/molding characteristics. It is also desirable that the tack of the uncured resin and prepreg remain relatively stable during storage and handling so that the desired levels of strength and/or damage tolerance can be obtained for a given cured composite.

If present, the internal mold release agent can constitute up to 5% or up to about 1% of the combined weight of the epoxy resin component and the BB (or combination of BB and other additional curing agent). Suitable internal mold release agents are well known and commercially available.

A solvent suitable for use as an additional ingredient is a material in which the epoxy resin, or BB, or both, are soluble. However, the solvent is not reactive with the epoxy resin(s) or the BB under the conditions of the polymerization/curing. The solvent (or mixture of solvents, if a mixture is used) can have a boiling temperature that is at least equal to and preferably higher than the curing temperature. Suitable solvents include, for example, glycol ethers such as ethylene glycol methyl ether and propylene glycol monomethyl ether; glycol ether esters such as ethylene glycol monomethyl ether acetate and propylene glycol monomethyl ether acetate; poly(ethylene oxide) ethers and poly (propylene oxide) ethers; polyethylene oxide ether esters and polypropylene oxide ether esters; amides such as N,N-dimethylformamide; aromatic hydrocarbons toluene and xylene; aliphatic hydrocarbons; cyclic ethers; halogenated hydrocarbons; and mixtures thereof. In some embodiments, the curable epoxy resin composition can comprise up to about 30 wt. % of a solvent. In some embodiments, the curable epoxy resin composition can comprise no more than about 5 wt. % or nor more than about 1 wt. % of a solvent.

An impact modifier can be used to reduce the brittleness of the cured composite material. Suitable impact modifiers include, for example natural or synthetic polymers having a $T_g$ of lower than $-40°$ C. These include, but are not limited to, natural rubber, styrene-butadiene rubbers, polybutadiene rubbers, isoprene rubbers, core-shell rubbers, butylene oxide-ethylene oxide block copolymers, and the like. The rubbers can be present in the form of small particles that become dispersed in the polymer phase of the composite. The rubber particles can be dispersed within the epoxy resin or BB and preheated together with the epoxy resin component or BB prior to mixing them together.

Suitable particulate fillers are materials that do not melt or thermally degrade under the conditions of the curing. Suitable particulate fillers can have an aspect ratio of less than 5 or less than 2. Suitable fillers include, but are not limited to, glass flakes, aramid particles, carbon black, carbon nanotubes, various clays such as montmorillonite, and other mineral fillers such as wollastonite, talc, mica, titanium dioxide, barium sulfate, calcium carbonate, calcium silicate, flint powder, carborundum, molybdenum silicate, sand, and the like. Some fillers are somewhat electroconductive, and their presence in the composite can increase the electroconductivity of the composite. In some applications, notably automotive applications, it is preferred that the composite is sufficiently electroconductive that coatings can be applied to the composite using so-called "e-coat" methods, in which an electrical charge is applied to the composite and the coating becomes electrostatically attracted to the composite. Conductive fillers of this type include metal particles (such as aluminum and copper), carbon black, carbon nanotubes, graphite and the like.

Prepregs are generally cured in a mold where, typically, several prepreg layers containing the fibrous reinforcement are superimposed. In some embodiments, the several prepreg layers are interspersed with layers of metal foil. The prepregs are then cured in the mold by heating (e.g., in an oven or autoclave). Suitable curing conditions include those described hereinabove with regard to the curable epoxy resin compositions. Thus, for example, in some embodiments, the curing is performed at a temperature of between about 80° C. and about 180° C. In some embodiments, the curing is performed in two, three or more stages, wherein each stage comprises heating the prepreg to a different temperature (e.g., between about 80° C. and about 180° C.) for a period of time.

In some embodiments, the presently disclosed subject matter provides a composite material comprising a cured prepreg, wherein the corresponding uncured prepreg comprises: (a) one or more epoxy resin component; (b) a BB isolated from a bio-oil produced from biomass, such as animal waste, optionally beef manure, dairy manure, swine manure, sheep manure, poultry manure, or a combination thereof; and (c) a fiber reinforcement. In some embodiments, the composite material comprises a cured prepreg where the prepreg comprises a fiber reinforcement and a curable epoxy resin composition, wherein the curable epoxy resin composition comprises an epoxy resin component and BB.

In some embodiments, the cured prepreg (or composite material) is a structural component (e.g., a side panel, a wing section, or a hull) of a vehicle, such as a car, truck, boat, or airplane. In some embodiments, the cured prepreg is a piece of sports equipment (e.g., a golf club) or a part thereof. In some embodiments, the cured prepreg is an orthopedic or prosthetic device or a portion of such a device. In some embodiments, the cured prepreg is an intermediate layer of a circuit board in an electronic device, an insulting material in an electronic machine or a transformer, or a rotor blade for a wind turbine.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Example 1

Green Epoxy Resin Preparation

Preparation of Biobinder:

Biobinder was prepared according to the methods generally described in U.S. Pat. No. 9,637,615, which is incorporated herein by reference in its entirety. Generally, biobinder can be prepared from bio-oil obtained from the thermochemical liquefaction (TCC) of animal waste, such as beef manure, dairy manure, swine manure, sheep manure, poultry manure, or combinations thereof. Different fractions of the bio-oil can be isolated via filtration and vacuum distillation.

More particularly, to prepare a bio-oil for the preparation of a biobinder of the instantly disclosed subject matter, swine manure from the farm of North Carolina A&T State University, Greensboro, N.C., United States of America, was filtered and maintained at 20% moisture and charged into an autoclave reactor. Nitrogen gas was used to purge the residual air in the reactor three times. The reactor as then heated to 305° C. at a pressure of 10.3 MPa for 80 min. After the reaction was completed, the reactor was rapidly cooled down to room temperature and the gas then released from the reactor. The aqueous side products were removed from the crude product by filtration under vacuum. If desired, the sticky reside from the vacuum filtration can be rinsed with 10-50% solvent (acetone or a 30:70 acetone/toluene mixture) and filtered.

After filtration, additional components were removed by heating the crude biobinder at 60° C. under vacuum (e.g., at 3 mm Hg) to remove any gases, solvent, and the "light liquid fraction" of the bio-oil, thereby yielding a biobinder product, which was a complex slurry-like mixture, containing both a liquid phase (a "heavy liquid fraction" of the bio-oil) and a solid phase ("bio-residue" from the bio-oil).

Characterization of Biobinder:

The biobinder as isolated contained high levels of both oxygen and nitrogen. The FTIR spectrum of biobinder showed characteristic peaks of —$NH_2$ (amine) functional groups at ~3300 $cm^{-1}$ (N—H stretching) and ~1600 $cm^{-1}$ (N—H bending). See FIG. 1.

Figure 3:
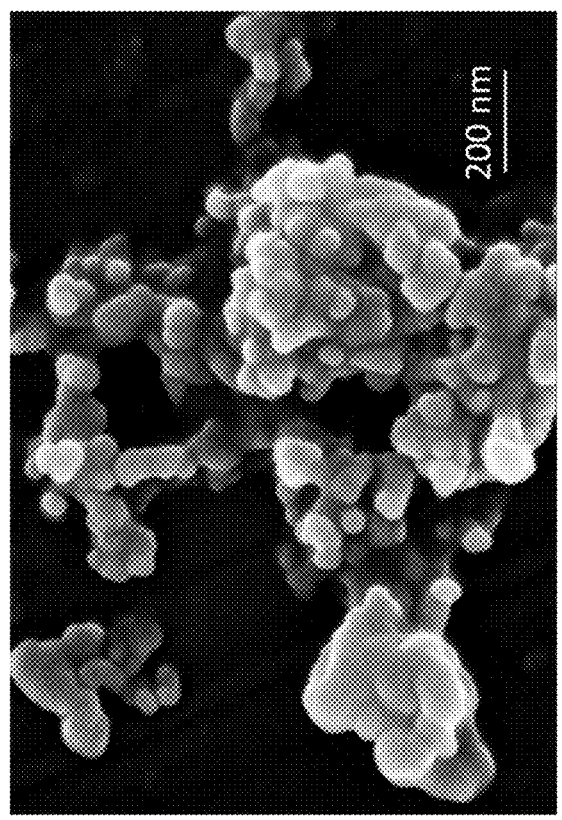
FIG. 3 is a scanning electron microscope (SEM) image of flocculate from a biobinder ethanol solution after being dried.
Figure 2:
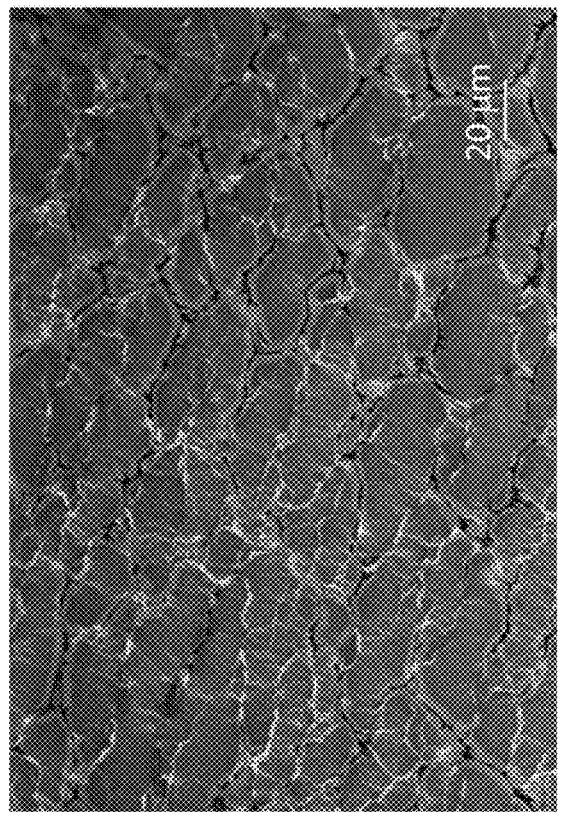
FIG. 2 is a scanning electron microscope (SEM) image of isolated supernatant from a biobinder ethanol solution after being dried.

To further investigate the composition of the biobinder, it was dissolved in ethanol (1:6 by weight) and sonicated for 10 min at 500 W followed by 30 min magnetic stirring. The resultant solution was centrifuged, separating the solid and liquid phases. Each of the solid phase and the supernatant was dried and examined using SEM. See FIGS. 2 and 3. The SEM images showed that the supernatant formed a solid layer after being dried, suggesting that the biobinder contained ethanol-soluble components. The SEM of the solid flocculate from centrifugation showed nanoparticle agglomerates with the dimensions of individual nanoparticles being a few tens of nanometers and the dimension of the nanoparticle agglomerate being a few hundreds of nanometers.

Figure 4:
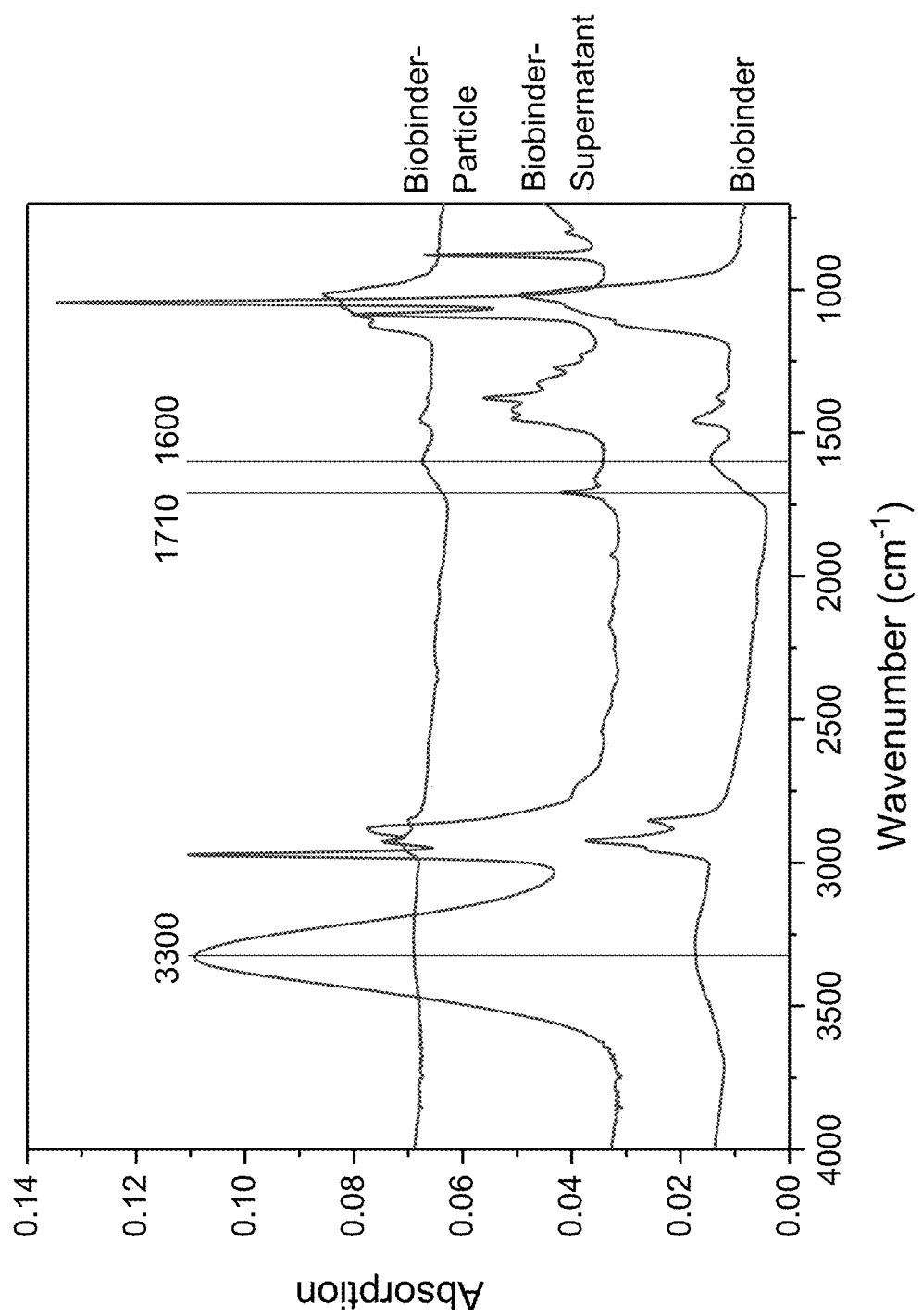
FIG. 4 is a graph showing the Fourier-transform infrared spectroscopy (FTIR) spectra of, from bottom to top, biobinder, supernatant from a biobinder ethanol solution after being dried, and flocculate from a biobinder ethanol solution after being dried.
Figure 5:
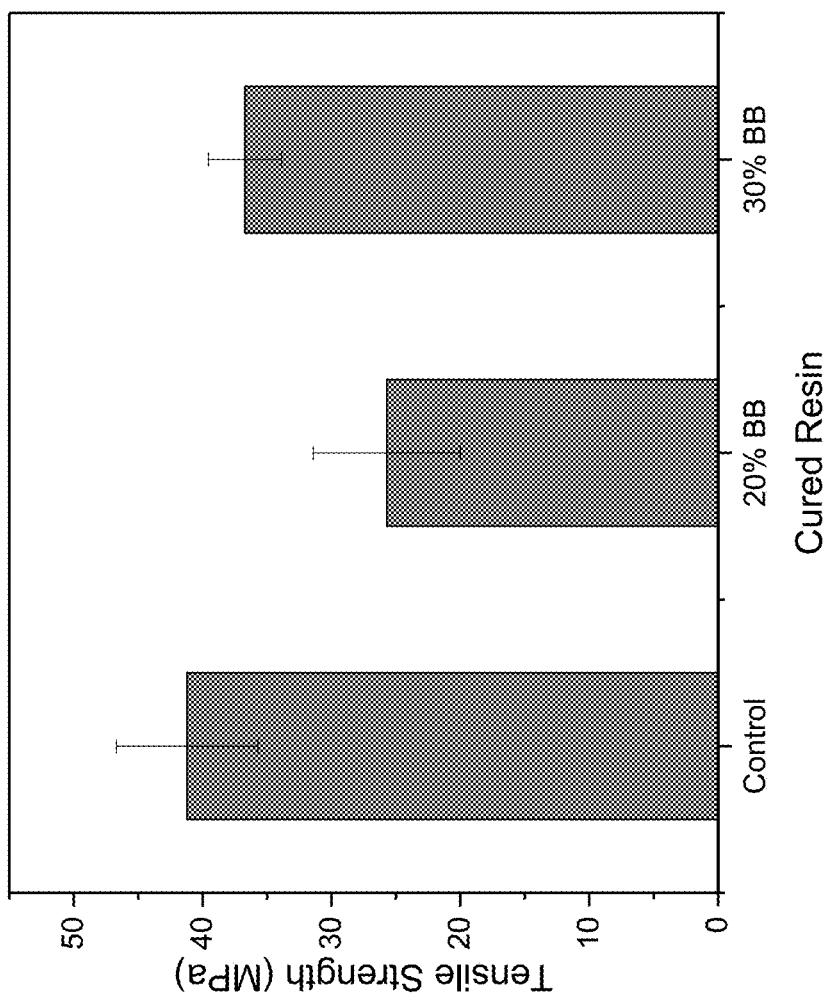
FIG. 5 is a bar graph of tensile strength (in megapascal (MPa)) for cured green epoxy resins of the presently disclosed subject matter with either 20 weight percentage (wt. %) biobinder (20% BB) or 30 wt. % biobinder (30% BB). For comparison, the tensile strength of a control epoxy (Control), cured without the addition of BB, is also shown.
Figure 6:
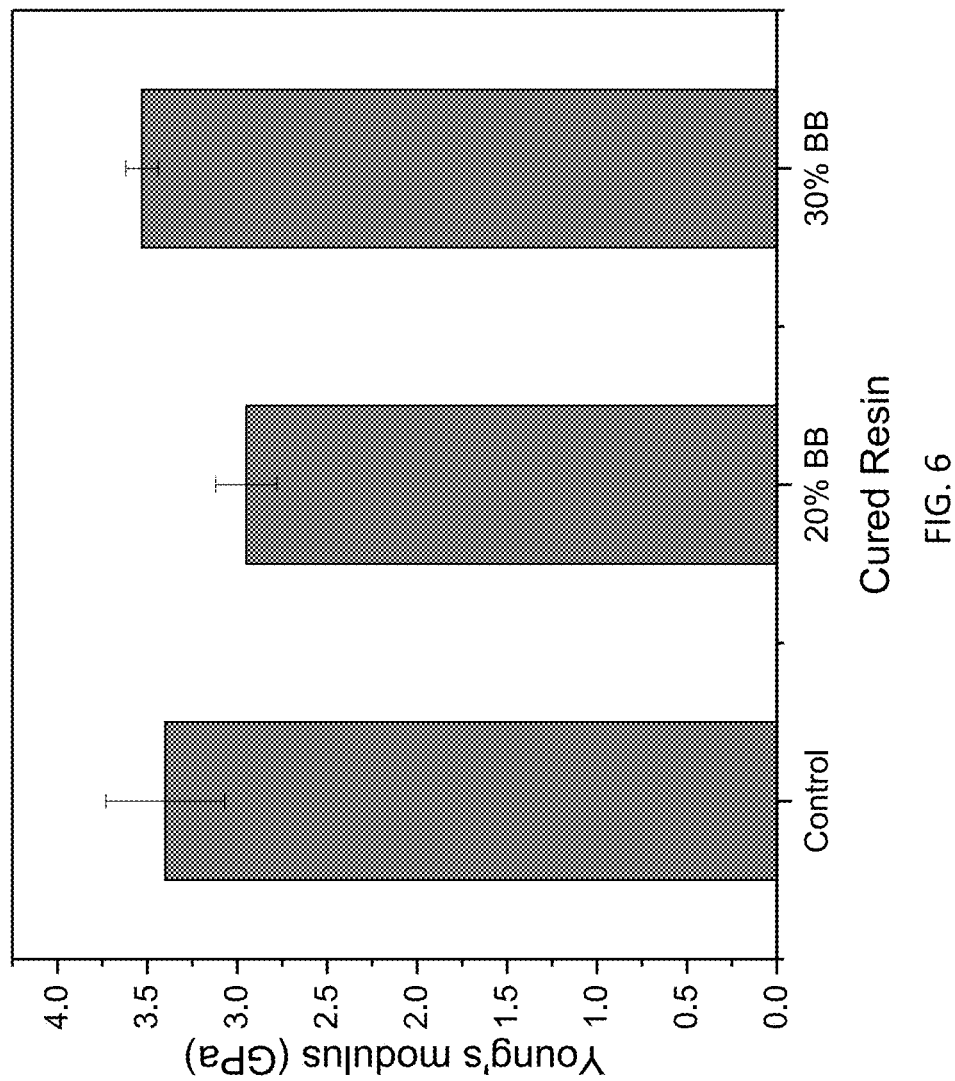
FIG. 6 is a bar graph of Young's modulus (in gigapascal (GPa)) for cured green epoxy resins of the presently disclosed subject matter with either 20 weight percentage (wt. %) biobinder (20% BB) or 30 wt. % biobinder (30% BB). For comparison, the Young's modulus of a control epoxy (Control), cured without the addition of BB, is also shown.
Figure 7:
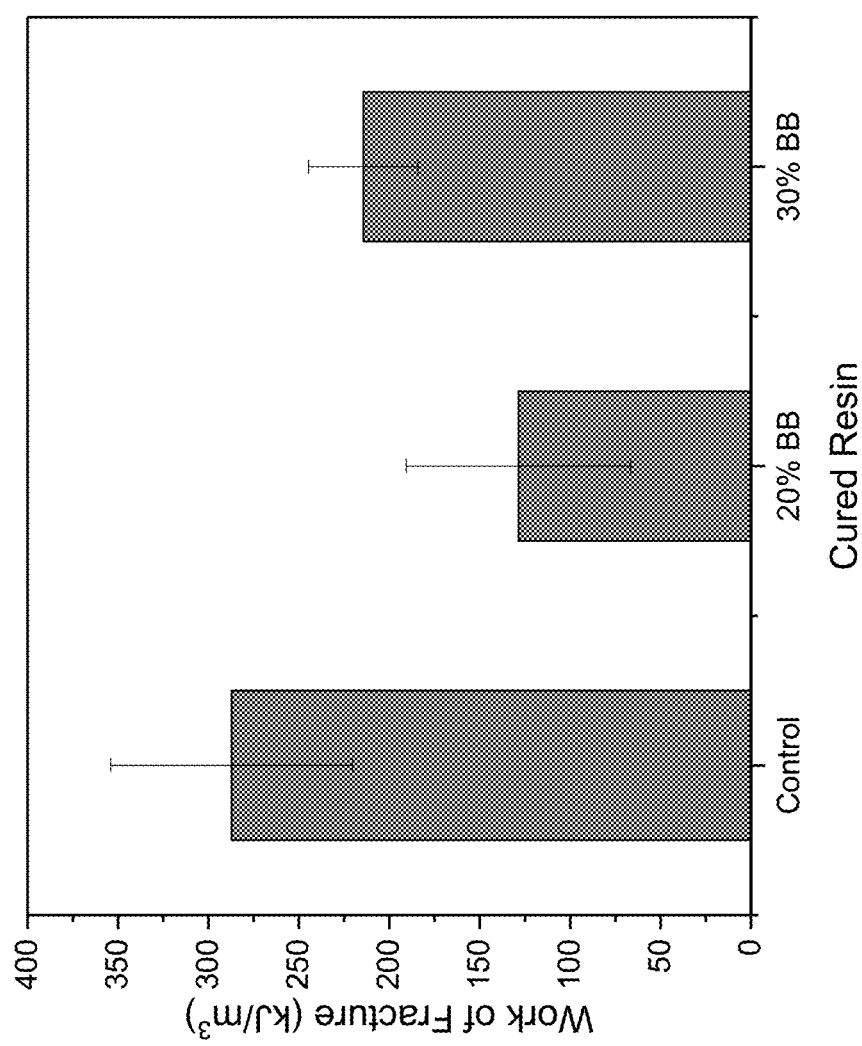
FIG. 7 is a bar graph of the work fracture (in kilojoules per cubic meter (kJ/m³)) for cured green epoxy resins of the presently disclosed subject matter with either 20 weight percentage (wt. %) biobinder (20% BB) or 30 wt. % biobinder (30% BB). For comparison, the work fracture of a control epoxy (Control), cured without the addition of BB, is also shown.
Figure 8:
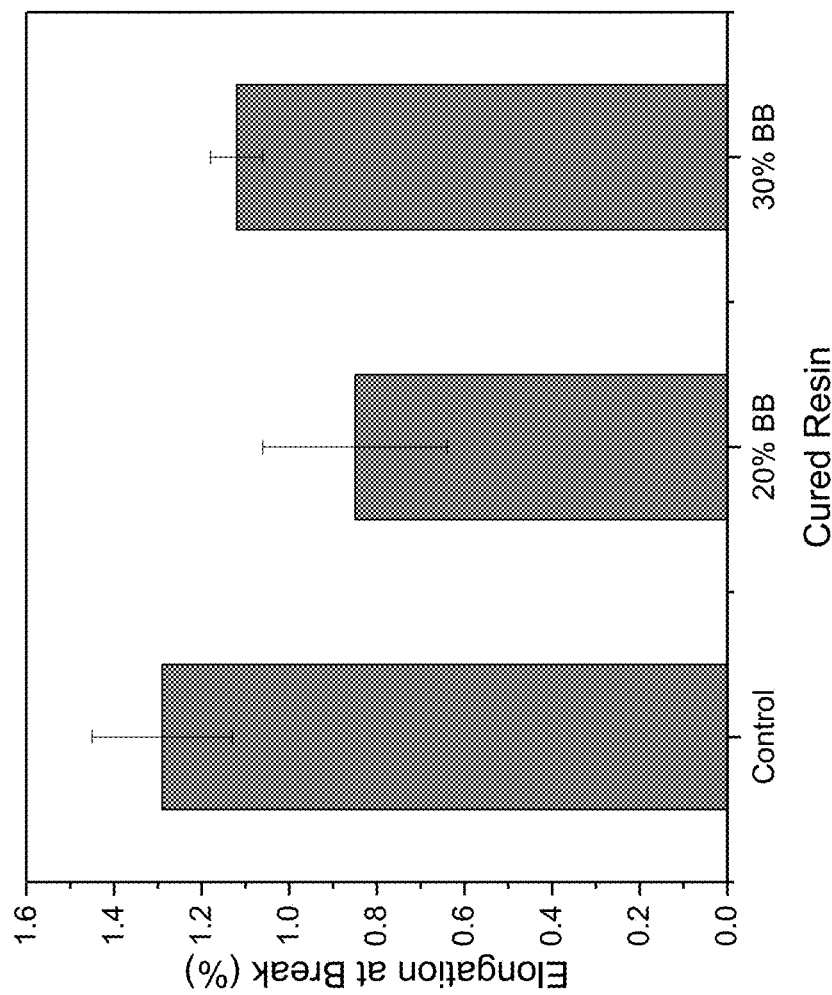
FIG. 8 is a bar graph of the elongation at break (in percentage (%)) for cured green epoxy resins of the presently disclosed subject matter with either 20 weight percentage (wt. %) biobinder (20% BB) or 30 wt. % biobinder (30% BB). For comparison, the tensile strength of a control epoxy (Control), cured without the addition of BB, is also shown.

An FTIR spectrum of each of the supernatant and the flocculate was collected and showed the presence of —OH (~3,300 $cm^{-1}$) and —COOH (~1,710 $cm^{-1}$) functional groups in the supernatant from the biobinder ethanol solution and the presence of —$NH_2$ (~1,600 $cm^{-1}$) functional groups in the biobinder particles. See FIG. 4. Without being bound by any one theory, it is believed that each of these functional groups can participate in reactions with epoxy groups in the epoxy resin that can lead to the curing of the resin.

Synthesis of Green Epoxy Resin with Biobinder:

The biobinder was added to an epoxy resin (EPON™ 862) at 70° C. at percentages of 10 weight percent ('wt. %'), 20 wt. %, and 30 wt. %.

Each epoxy/biobinder mixture was then sonicated at 500 W for 3 minutes using a digital ultrasonic probe (Branson Ultrasonics Corp., Danbury, Conn., United States of America) to ensure homogeneous mixing. Each mixture was further magnetically stirred for 20 minutes followed by degassing at 70° C. under house vacuum until no air bubbles were seen.

Each degassed mixture was poured into a 6×6 inch mold and cured in a convection oven according to the following heating: oven was heated from room temperature to 82° C. in 15 min, and then was held at 82° C. for 4 hours; next the oven was heated to 104° C. in 15 min and held at that temperature for 4 hours; the oven was then heated to 121° C. in 15 min and held there for another 4 hours; finally the oven was cooled to room temperature.

Preparation of a Control Epoxy Resin:

A control epoxy panel of the same total weight (as the green biobinder epoxies above) was prepared using EPON™ 862 with curing agent W (Miller-Stephenson, Danbury, Conn., United States of America) at the manufacturer-suggested composition (100:26.7 by weight) following the same preparation procedure and heating (curing).

Example 2

Characterization of Manufactured Resins

The green epoxy resin prepared with 10 wt. % biobinder was still sticky after curing and was not tested for mechanical properties. The other cured composite panels were each cut into dog-bone shape specimens.

To evaluate the strength of each prepared sample, a standard tensile test was carried out according to ASTM D638-97 Type IV at a cross-head speed of 5 mm/min using a computer-controlled mechanical testing machine (INSTRON 5900R, Instron, Norwood, Mass., United States of America).

In addition to strength, the stiffness, ductility and toughness of the cured green epoxy resin were characterized by Young's modulus, elongation at break and work of fracture of the cured green epoxy resin. See FIGS. 5 to 8. The results show that the mechanical properties of the green epoxy resin increased upon increasing the weight percent of the biobinder from 20 wt. % to 30 wt. %.

Figure 9B:
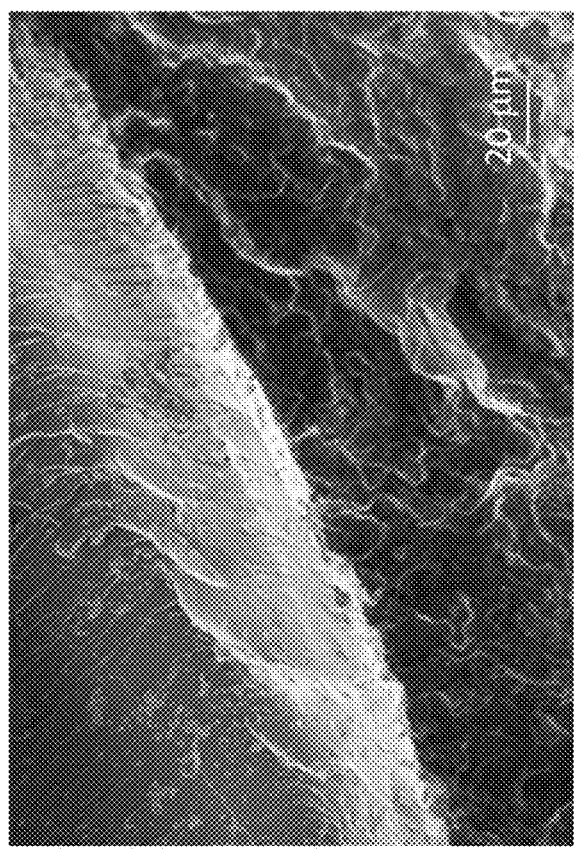
FIG. 9B is a scanning electron microscope (SEM) image of the fracture surface of a cured green epoxy resin of the presently disclosed subject matter with 20 weight percent (wt. %) biobinder.
Figure 9A:
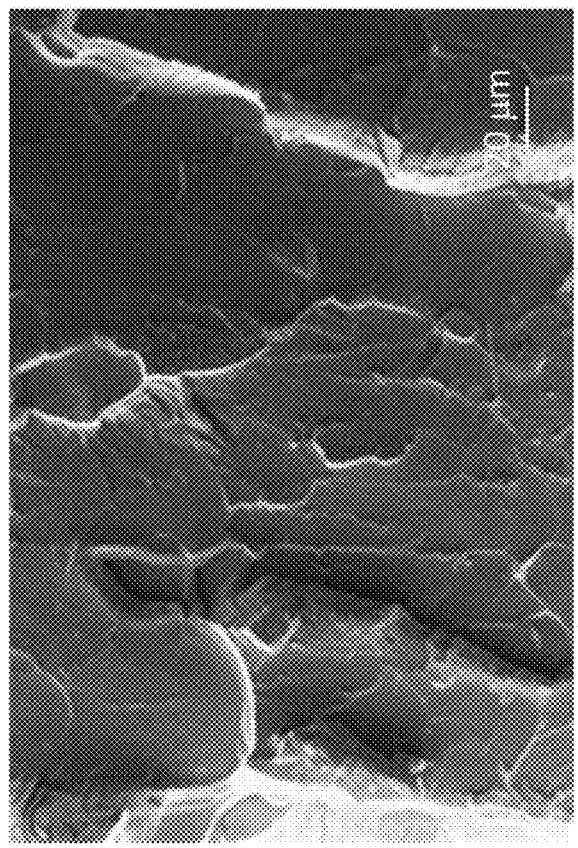
FIG. 9A is a scanning electron microscope (SEM) image of the fracture surface of a cured "control" epoxy resin prepared in the absence of biobinder.
Figure 9C:
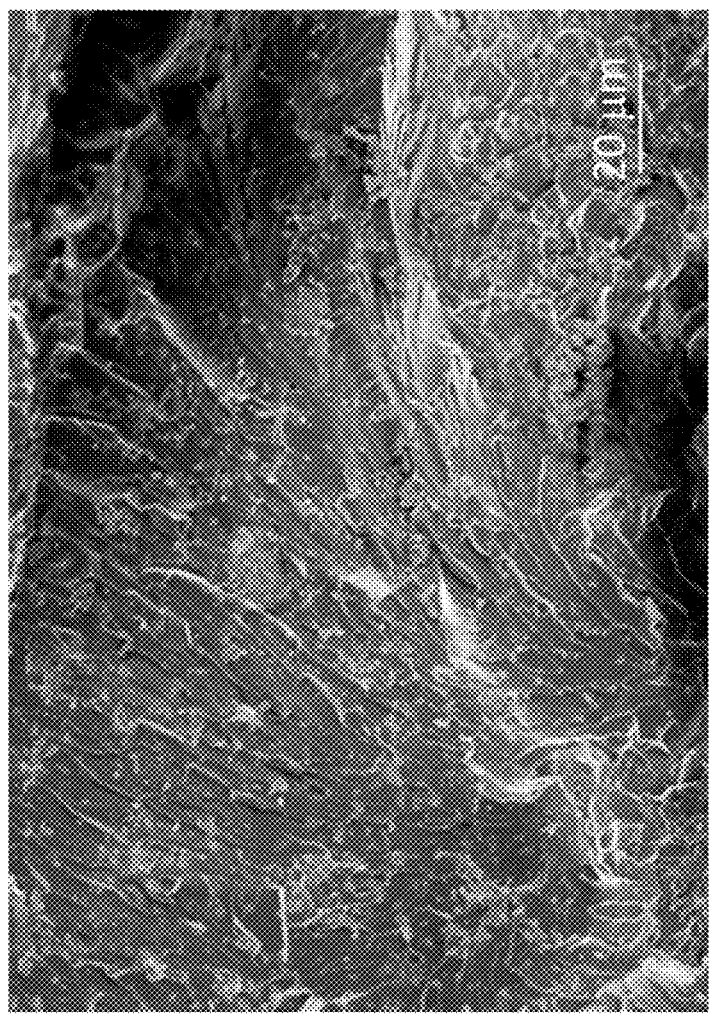
FIG. 9C is a scanning electron microscope (SEM) image of the fracture surface of a cured green epoxy resin of presently disclosed subject matter with 30 weight percent (wt. %) biobinder.

The fracture surfaces of these specimen were examined under SEM. See FIGS. 9A-9C. The fracture surface morphology of the cured green epoxy resin with the biobinder showed sub-micrometer particles.

As shown herein, biobinder can be used to partially replace epoxy resin and serve as curing agent for epoxy resin. Without being bound by any one theory, it is believed that the nanoparticles in the biobinder can contribute to the reinforcement of the resulting cured green epoxy resin.

Example 3

Synthesis and Characterization of Green Epoxy Resins

The biobinder is added to an epoxy resin (EPON™ 862) at 70° C. at percentages of 32.5 wt. %, 35 wt. %, 40 wt. %, and 45 wt. %.

Each epoxy/biobinder mixture is sonicated at 500 W for 3 minutes using a digital ultrasonic probe (Branson Ultrasonics Corp., Danbury, Conn., United States of America) to ensure homogeneous mixing. Each mixture is further magnetically stirred for 20 minutes followed by degassing at 70° C. under house vacuum until no air bubbles are seen.

Each degassed mixture is poured into a 6×6 inch mold and cured in a convection oven according to the following heating: the oven is heated from room temperature to 82° C. in 15 min, and is held at 82° C. for 4 hours; next the oven is heated to 104° C. in 15 min and held at that temperature for 4 hours; the oven is then heated to 121° C. in 15 min and held there for another 4 hours; finally the oven is cooled to room temperature.

To evaluate the strength of each prepared sample, consistent with the methods disclosed herein, standard tensile tests, as well as measurements of stiffness, ductility and toughness of the cured green epoxy resins are characterized by Young's modulus, elongation at break and work of fracture of the cured green epoxy resin.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A curable epoxy resin composition comprising:
   (a) an epoxy resin component; and
   (b) a biobinder isolated from a bio-oil produced via thermochemical liquefaction of beef manure, dairy manure, swine manure, sheep manure, poultry manure, or a combination thereof.

2. The curable epoxy resin composition of claim 1, wherein the epoxy resin component comprises one or more of the reaction product of epichlorohydrin and bisphenol A and the reaction product of epichlorohydrin and bisphenol F.

3. The curable epoxy resin composition of claim 1, wherein the biobinder is isolated from a bio-oil produced via thermochemical liquefaction of swine manure.

4. The curable epoxy resin composition of claim 3, wherein the biobinder is free of compounds having a boiling point at 3 mm Hg of 60° C. or less.

5. The curable epoxy resin composition of claim 1, wherein the curable epoxy resin composition comprises at least about 15% by weight of the biobinder.

6. The curable epoxy resin composition of claim 5, wherein the curable epoxy resin composition comprises about 30% by weight of the biobinder.

7. The curable epoxy resin composition of claim 1, further comprising one or more performance enhancing or modifying agents selected from the group consisting of a non-epoxy resin, a flexibilizer, a stabilizer, a flow promoter, a toughening agent, an accelerator, a core shell rubber, a flame retardant, a wetting agent, a colorant, a UV absorber, an antioxidant, an antimicrobial agent, a filler, a conducting particle, and a viscosity modifier.

8. The curable epoxy resin composition of claim 1, wherein the epoxy resin component comprises one or more of the reaction product of epichlorohydrin and bisphenol A and the reaction product of epichlorohydrin and bisphenol F; and the biobinder is isolated from a bio-oil produced via thermochemical liquefaction of swine manure.

9. The curable epoxy resin composition of claim 8, wherein the curable epoxy resin composition comprises at least about 15% by weight of the biobinder.

10. An article comprising a cured epoxy resin prepared by curing the curable epoxy resin of claim 1.

11. A method of preparing a cured epoxy resin composition, the method comprising contacting biobinder isolated from a bio-oil produced via thermochemical liquefaction of beef manure, dairy manure, swine manure, sheep manure, poultry manure, or a combination thereof with at least one epoxy resin component, to provide a curable epoxy resin composition; and curing the curable epoxy resin composition.

12. The method of claim 11, wherein the at least one epoxy resin component comprises one or more of the reaction product of epichlorohydrin and bisphenol A and the reaction product of epichlorohydrin and bisphenol F.

13. The method of claim 11, further comprising contacting the biobinder, epoxy resin, or combination thereof with one or more performance enhancing or modifying agents selected from the group consisting of a non-epoxy resin, a flexibilizer, a stabilizer, a flow promoter, a toughening agent, an accelerator, a core shell rubber, a flame retardant, a wetting agent, a colorant, a UV absorber, an antioxidant, an antimicrobial agent, a filler, a conducting particle, and a viscosity modifier.

14. The method of claim 11, wherein the curable epoxy resin composition comprises at least about 15% by weight of the biobinder.

15. The method of claim 11, further comprising:
   (i) providing a bio-oil produced via thermochemical liquefaction of beef manure, dairy manure, swine manure, sheep manure, poultry manure, or a combination thereof;
   (ii) distilling the bio-oil to remove a light liquid fraction, wherein the distilling occurs at a vacuum pressure of between about 1 mm Hg and about 80 mm Hg while heating to a temperature of up to about 60° C.; and
   (iii) isolating the biobinder from the bio-oil.

16. The method of claim 11, wherein the curing comprises heating the curable epoxy resin, to a temperature of at least about 80° C. or more for a period of time.

17. A curable prepreg comprising:
   (a) an epoxy resin component;
   (b) a biobinder isolated from a bio-oil produced via thermochemical liquefaction of beef manure, dairy manure, swine manure, sheep manure, poultry manure, or a combination thereof; and
   (c) a fiber reinforcement, comprising one or more fibers and wherein the fiber reinforcement is in contact with one or both of (a) and (b).

18. The curable prepreg of claim 17, wherein the biobinder is isolated from a bio-oil produced via thermochemical liquefaction of swine manure and the fiber reinforcement comprises one or more of glass, carbon or aramid fibers.

19. A composite material comprising a cured prepreg of claim 17.

* * * * *